US010902329B1

(12) United States Patent
Mills et al.

(10) Patent No.: US 10,902,329 B1
(45) Date of Patent: Jan. 26, 2021

(54) TEXT RANDOM RULE BUILDER

(71) Applicant: SAS Institute Inc., Cary, NC (US)

(72) Inventors: Bruce Monroe Mills, Cary, NC (US); Vinicius Rabbi Vivaldi, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/801,775

(22) Filed: Feb. 26, 2020

Related U.S. Application Data

(60) Provisional application No. 62/894,122, filed on Aug. 30, 2019.

(51) Int. Cl.

| | |
|---|---|
| ***G06N 20/00*** | (2019.01) |
| ***G06F 16/31*** | (2019.01) |
| ***G06N 5/02*** | (2006.01) |
| ***G06F 40/279*** | (2020.01) |
| ***G06F 40/253*** | (2020.01) |
| ***G06F 3/0482*** | (2013.01) |

(52) U.S. Cl.
CPC ............. *G06N 5/025* (2013.01); *G06F 16/31* (2019.01); *G06F 40/253* (2020.01); *G06F 40/279* (2020.01); *G06N 20/00* (2019.01); *G06F 3/0482* (2013.01)

(58) Field of Classification Search
CPC ........ G06N 5/025; G06N 20/00; G06F 16/31; G06F 40/253; G06F 40/279; G06F 3/0482
See application file for complete search history.

(56) References Cited

U.S. PATENT DOCUMENTS

| | | | |
|---|---|---|---|
| 6,996,575 B2 | 2/2006 | Cox et al. | |
| 8,706,742 B1 * | 4/2014 | Ravid | G06N 5/04 707/749 |
| 8,832,015 B2 | 9/2014 | Cox et al. | |

(Continued)

OTHER PUBLICATIONS

Zander, Sebastian & Armitage, Grenville. (2011). Practical machine learning based multimedia traffic classification for distributed QoS management. Proceedings—Conference on Local Computer Networks, LCN. 399-406. 10.1109/LCN.2011.6115322. (Year: 2011).*

(Continued)

*Primary Examiner* — Michael J Huntley
*Assistant Examiner* — Ahsif A. Sheikh
(74) *Attorney, Agent, or Firm* — Coats & Bennett PLLC

(57) ABSTRACT

A computing device receives training data representing different observations where each observation is categorized into one of options for a target variable. The device obtains computer command(s) for categorizing into one of the options for the target variable. The device generates a sampling scheme for sampling terms of the training data. The device generates sampling models by, for N iterations of the sampling scheme: determining a subset of the training data based on a training data index; sampling, based on a term index, the subset of the training data for a subset of terms; and generating, based on the subset of terms, a sampling model for categorizing, according to the computer command(s). Each sampling model is generated from a different subset of terms such that the sampling models are randomized. The device computes an aggregated model for categorizing test data into one of the options for the target variable.

30 Claims, 29 Drawing Sheets

(56) References Cited

U.S. PATENT DOCUMENTS

| | | | | |
|---|---|---|---|---|
| 9,009,027 | B2 | 4/2015 | Lehman et al. | |
| 9,092,734 | B2 | 7/2015 | Cox et al. | |
| 9,116,985 | B2 | 8/2015 | Mills et al. | |
| 9,117,174 | B2 | 8/2015 | Cox et al. | |
| 9,210,866 | B2 | 12/2015 | Bhatnagar et al. | |
| 9,251,465 | B2 | 2/2016 | Cox et al. | |
| 9,280,747 | B1 | 3/2016 | Jin et al. | |
| 9,495,647 | B2 | 11/2016 | Zhao et al. | |
| 9,510,522 | B2 | 12/2016 | Yrjana et al. | |
| 9,552,547 | B2 | 1/2017 | Leeman-Munk et al. | |
| 9,582,761 | B2 | 2/2017 | Cox et al. | |
| 9,595,002 | B2 | 3/2017 | Leeman-Munk et al. | |
| 9,704,097 | B2 | 7/2017 | Devarajan et al. | |
| 9,704,102 | B2 * | 7/2017 | Baraniuk | G09B 7/00 |
| 9,934,462 | B1 | 4/2018 | Healey et al. | |
| 10,048,826 | B2 | 8/2018 | Leeman-Munk et al. | |
| 10,192,001 | B2 | 1/2019 | Leeman-Munk et al. | |
| 10,275,479 | B2 | 4/2019 | Zhao et al. | |
| 10,324,983 | B2 | 6/2019 | Leeman-Munk et al. | |
| 10,366,117 | B2 | 7/2019 | Mills et al. | |

OTHER PUBLICATIONS

Li, Ming, et al., "Text classification based on ensemble extreme learning machine", https://arxiv.org/ftp/arxiv/papers/1805/1805.06525.pdf (10 pages) (Year: 2018).*

Brownlee, Jason, "A Gentle Introduction to the Bag-of-Words Model", https://machinelearningmastery.com/gentle-introduction-bag-words-model (Sep. 25, 2019).

Xu, Baoxun, et al., "An Improved Random Forest Classifier for Text Categorization", Journal of Computers, vol. 7, No. 12, pp. 2913-2920 (Dec. 2012).

Arras, Leila, et al., "'What is relevant in a text document?': An interpretable machine learning approach", https://journals.plos.org/plosone/article?id=10.1371/journal.pone.0181142.

Ray, Sunil, "Quick Introduction to Boosting Algorithms in Machine Learning" Quick Guide to Boosting Algorithms in Machine Learning, https://www.analyticavidhya.com/blog/2015/11/quick-introduction-boosting-algorithms-machine-learning/ (Sep. 25, 2019).

Brownlee, Jason, "Boosting and AdaBoost for Machine Learning, Machine Learning Algorithms", https://machinelearningmastery.com/boosting-and-adaboost-for-machine-learning/ (Sep. 25, 2019).

"Bag-of-words model", Wikipedia, https://en.wikipedia.org/wiki/Bag-of-words_model (Sep. 25, 2019).

Lee, Jung-Jin, et al., "AdaBoost for Text Detection in Natural Scene", 2011 International Conference on Document Analysis and Recognition, pp. 429-434 (2011).

Li, Ming, et al., "Text classification based on ensemble extreme learning machine", https://arxiv.org/ftp/arxiv/papers/1805/1805.06525.pdf (10 pages).

* cited by examiner

1500

| | |
|---|---|
| 8943 | xmas |
| 8944 | y class |
| 8945 | y+ |
| 8946 | yang |
| 8947 | yard |
| 8948 | yeah |
| 8949 | year |
| 8950 | yell |
| 8951 | yellow |
| 8952 | yellowstone |
| 8953 | yes |
| 8954 | yesterday |
| 8955 | yield |
| 8956 | yo |
| 8957 | yoghurt |
| 8958 | yogurt |
| 8959 | york |
| 8960 | young |
| 8961 | young child |
| 8962 | young daughter |
| 8963 | young family |
| 8964 | young girl |
| 8965 | young kid |
| 8966 | young lady |
| 8967 | young man |
| 8968 | young woman |
| 8969 | yr |
| 8970 | yrs |
| 8971 | yul |
| 8972 | yummy |
| 8973 | yvr |
| 8974 | yvr-hkg |
| 8975 | yvr-lhr |
| 8976 | ywg |
| 8977 | yyc |
| 8978 | yyz |
| 8979 | yyz-fco |
| 8980 | yyz-lhr |
| 8981 | zagreb |
| 8982 | zealand |
| 8983 | zero |
| 8984 | zhengzhou |
| 8985 | zipper |
| 8986 | zone |
| 8987 | zoo |
| 8988 | zrh |
| 8989 | zurich |

| DocID | Bad_m1 | good_m1 | bad_m2 | good_m2 | bad_m3 | good_m3 | actual |
|---|---|---|---|---|---|---|---|
| 1 | 20.0% | 80.0% | 40.0% | 60.0% | 50.0% | 50.0% | Good |

Indication of Model 1352

1710

| mean_aggregation | |
|---|---|
| bad | good |
| 36.7% | 63.3% |

1720

| max_aggregation | |
|---|---|
| bad | good |
| 50.0% | 80.0% |

1730

| mean_aggregation | |
|---|---|
| bad | good |
| 32.5% | 67.5% |

1740 good

1750 correct

Model-Level Term Importance-Good Review

| Target | Term | Weighted F1-Score | Relative Importance |
|---|---|---|---|
| Good Review | great | 3.81 | 1 |
| Good Review | delicious | 3.67 | 0.965 |
| Good Review | good | 2.81 | 0.739 |
| Good Review | excellent | 2.39 | 0.629 |
| Good Review | perfect | 2.02 | 0.531 |
| Good Review | love | 1.91 | 0.501 |
| Good Review | definitely | 1.83 | 0.481 |
| Good Review | amaze | 1.67 | 0.438 |
| Good Review | favorite | 1.32 | 0.346 |
| Good Review | friendly | 1.17 | 0.307 |
| Good Review | ... | ... | ... |

Model-Level Term Importance-Bad Review

| Target | Term | Weighted F1-Score | Relative Importance |
|---|---|---|---|
| Bad Review | terrible | 2.507 | 1 |
| Bad Review | poison | 2.161 | 0.862 |
| Bad Review | disgust | 1.959 | 0.781 |
| Bad Review | rude | 1.669 | 0.666 |
| Bad Review | awful | 1.663 | 0.664 |
| Bad Review | horrible | 1.249 | 0.498 |
| Bad Review | bad | 1.151 | 0.459 |
| Bad Review | tasteless | 0.777 | 0.31 |
| Bad Review | order | 0.765 | 0.305 |
| Bad Review | sick | 0.682 | 0.272 |
| Bad Review | ... | ... | .... |

Observation-Level Term Importance-Good Review

| Doc ID | Target | Term | Relative Importance |
|---|---|---|---|
| 7 | Good Review | delicious | 1 |
| 7 | Good Review | fun | 0.0576 |
| 7 | Good Review | spot | 0.0319 |

Observation-Level Term Importance-Bad Review

| Text ID | Target | Term | Relative Importance |
|---|---|---|---|
| 17 | Bad Review | mediocre | 1 |
| 17 | Bad Review | sick | 0.7714 |
| 17 | Bad Review | bland | 0.6751 |
| 17 | Bad Review | good | 0.0877 |
| 17 | Bad Review | taste | 0.0608 |
| 17 | Bad Review | order | 0.0325 |

Rule Performance

2100

| TARGET | Rule_Id | F1 | PRECISION | RECALL | F1 Delta |
|---|---|---|---|---|---|
| Good Review | 1 | 0.029591 | 1 | 0.015017 | 0.029591 |
| Good Review | 2 | 0.100371 | 0.98846154 | 0.05287 | 0.07078 |
| Good Review | 3 | 0.118011 | 0.99025974 | 0.062744 | 0.01764 |
| Good Review | 4 | 0.13318 | 0.99142857 | 0.071384 | 0.015169 |
| Good Review | 5 | 0.150922 | 0.9925 | 0.08167 | 0.017742 |
| Good Review | 6 | 0.163489 | 0.99311927 | 0.089076 | 0.012567 |
| Good Review | 7 | 0.208356 | 0.98951049 | 0.116437 | 0.044868 |
| Good Review | 8 | 0.230783 | 0.98909657 | 0.130632 | 0.022427 |
| Good Review | 9 | 0.292017 | 0.9800235 | 0.17157 | 0.061234 |
| Good Review | 10 | 0.303894 | 0.98092031 | 0.179798 | 0.011877 |

*FIG. 21A*

Rule Weight

2150

| Target | Term Weight | Rule_Id | Term |
|---|---|---|---|
| Good Review | 0.500001 | 1 | great |
| Good Review | 0.500001 | 1 | perfect |
| Good Review | 0.500001 | 2 | delicious |
| Good Review | 0.500001 | 2 | great |
| Good Review | 0.500001 | 4 | delicious |
| Good Review | 0.500001 | 4 | fresh |
| Good Review | 0.500001 | 6 | brunch |
| Good Review | 0.500001 | 6 | great |
| Good Review | 0.500001 | 8 | definitely |
| Good Review | 0.500001 | 8 | good |
| Good Review | 0.500001 | 9 | area |
| Good Review | 0.500001 | 9 | good |
| Good Review | 0.500001 | 10 | crowd |
| Good Review | 0.500001 | 10 | good |

*FIG. 21B*

Term Level Weighted F1 Score for a Sampling Model

| Target | Term Weight | Rule_Id | Term | F1 Delta | Weighted F1-Score |
|---|---|---|---|---|---|
| Good Review | 0.500001 | 1 | great | 0.039612 | 0.019806022 |
| Good Review | 0.500001 | 1 | perfect | 0.039612 | 0.019806022 |
| Good Review | 0.500001 | 2 | delicious | 0.088811 | 0.044405445 |
| Good Review | 0.500001 | 2 | great | 0.088811 | 0.044405445 |
| Good Review | 0.500001 | 4 | delicious | 0.034535 | 0.017267373 |
| Good Review | 0.500001 | 4 | fresh | 0.034535 | 0.017267373 |
| Good Review | 0.500001 | 6 | brunch | 0.017166 | 0.008582914 |
| Good Review | 0.500001 | 6 | great | 0.017166 | 0.008582914 |
| Good Review | 0.500001 | 8 | definitely | 0.053154 | 0.02657709 |
| Good Review | 0.500001 | 8 | good | 0.053154 | 0.02657709 |
| Good Review | 0.500001 | 9 | area | 0.035933 | 0.017966779 |
| Good Review | 0.500001 | 9 | good | 0.035933 | 0.017966779 |
| Good Review | 0.500001 | 10 | crowd | 0.02253 | 0.011265194 |
| Good Review | 0.500001 | 10 | good | 0.02253 | 0.011265194 |

Term Level Weighted F1 Score for Aggregated Model

2250

2252 2254

| Target | Term | Weighted F1 Score | Relative Importance |
|---|---|---|---|
| Good Review | great | 3.806386789 | 1 |
| Good Review | delicious | 3.671998229 | 0.96469393 |
| Good Review | good | 2.814772763 | 0.739486794 |
| Good Review | excellent | 2.392562149 | 0.628565168 |
| Good Review | perfect | 2.020988664 | 0.530946742 |
| Good Review | love | 1.90646171 | 0.50085864 |
| Good Review | definitely | 1.830437353 | 0.480885799 |
| Good Review | amaze | 1.666501328 | 0.437817127 |
| Good Review | favorite | 1.31745988 | 0.346118236 |
| Good Review | friendly | 1.167774539 | 0.306793451 |

*FIG. 22B*

TEXT RANDOM RULE BUILDER

RELATED APPLICATIONS

This application claims the benefit of U.S. Provisional Application No. 62/894,122, filed Aug. 30, 2019, the disclosures of each of which are incorporated herein by reference in their entirety.

BACKGROUND

Natural or human language data processing involves processing of computer commands (e.g., rules) to enable computers to derive meaning from text information. One type of computer model is used to classify text information according to computer commands into different categories. For example, if the text information includes reviews of a restaurant, a computer model can be used to classify the different reviews into good reviews and bad reviews.

SUMMARY

In an example embodiment, a computer-program product tangibly embodied in a non-transitory machine-readable storage medium is provided. The computer-program product includes instructions to cause a computing device to output an indication of an aggregated model for categorizing test data into one of options for a target variable. The computing device receives training data representing different observations of text information in a human language. Each observation of the different observations is categorized into one of options for a target variable. The options comprise at least two options within a category for the target variable. The computing device obtains one or more computer commands. Each respective computer command of the one or more computer commands specifies a rule for categorizing, based on identifying one or more terms of input data, the input data into one of the options for the target variable. The computing device generates a sampling scheme for sampling terms of the training data according to the one or more computer commands by obtaining a variable N indicating a number of iterations for executing the sampling scheme; obtaining one or more training data indexes; and obtaining one or more term indexes. Each index of the one or more training data indexes indicates a percentage of the training data, and each index of the one or more term indexes indicates a percentage of terms. The computing device generates multiple randomized sampling models by, for N iterations of the sampling scheme: determining a respective subset of the training data based on a respective training data index of the one or more training data indexes; sampling, based on a respective term index of the one or more term indexes, the respective subset of the training data for a subset of terms identified in the respective subset of the training data according to the one or more computer commands; and generating, based on the subset of terms, a respective sampling model, of a set of sampling models, for categorizing, according to the one or more computer commands. Each respective sampling model of the set is generated from a different subset of terms than other sampling models of the set such that the sampling models of the set are randomized. The computing device computes an aggregated model for categorizing, according to all the multiple randomized sampling models, test data into one of the options for the target variable. The computing device outputs an indication of the aggregated model.

In another example embodiment, a computing device is provided. The computing device includes, but is not limited to, a processor and memory. The memory contains instructions that when executed by the processor control the computing device to output an indication of an aggregated model for categorizing test data into one of options for a target variable.

In another example embodiment, a method of outputting an indication of an aggregated model for categorizing test data into one of options for a target variable is provided.

Other features and aspects of example embodiments are presented below in the Detailed Description when read in connection with the drawings presented with this application.

BRIEF DESCRIPTION OF THE DRAWINGS

FIG. 15 illustrates an example list of terms from computer commands in at least one embodiment of the present technology.

FIG. 17 illustrates example indications of an aggregated model in at least one embodiment of the present technology.

FIGS. 19A-19B illustrate example output of term scoring for model-level term importance in at least one embodiment of the present technology.

FIGS. 20A-20B illustrate example output of term scoring for observation-level term importance in at least one embodiment of the present technology.

FIG. 21A illustrates example performance scoring for rules in at least one embodiment of the present technology.

FIG. 21B illustrates example performance rule weighting for terms in at least one embodiment of the present technology.

FIG. 22A illustrates example output of term scoring for a sampling model in at least one embodiment of the present technology.

FIG. 22B illustrates example output of term scoring for an aggregated model in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
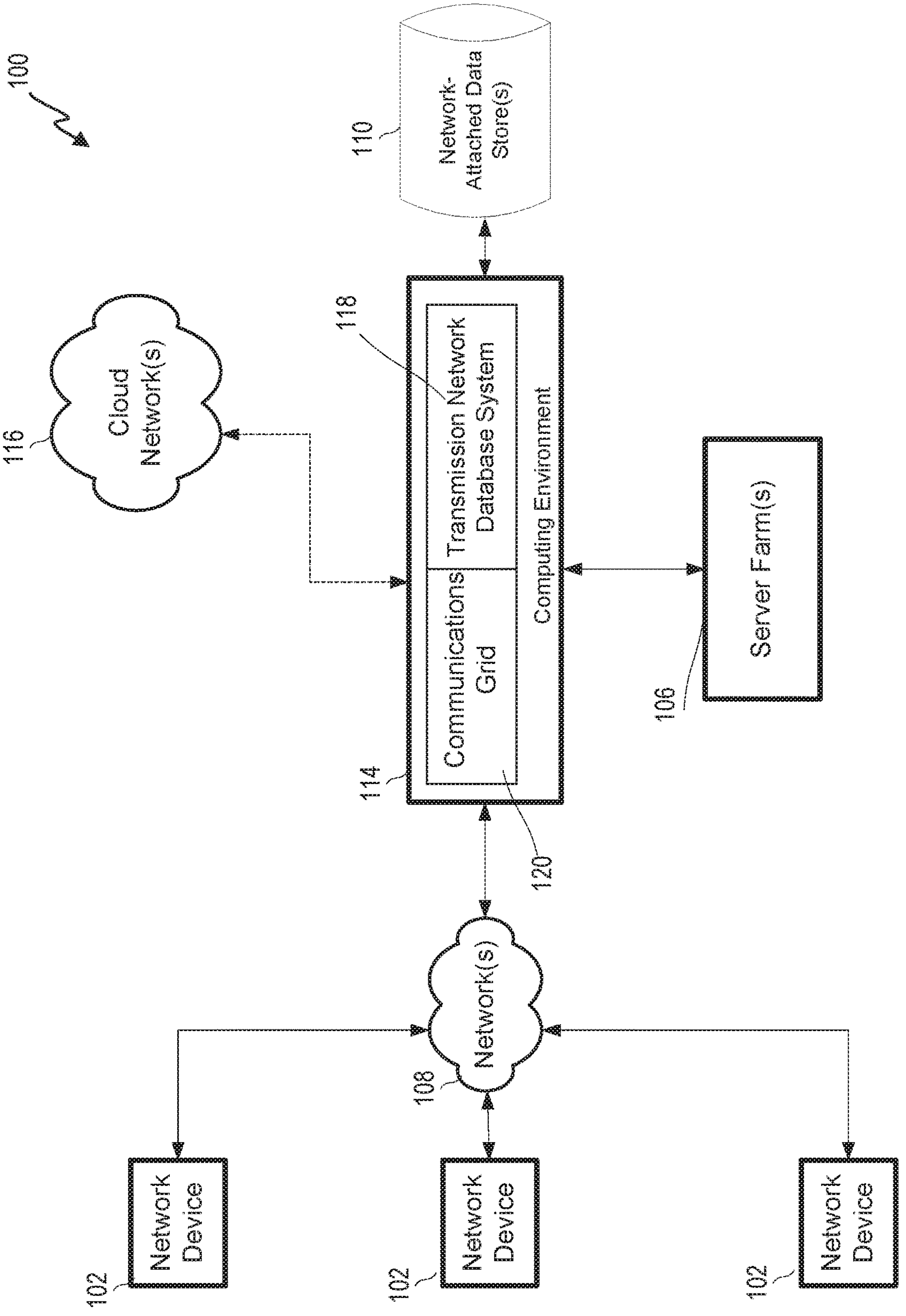
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
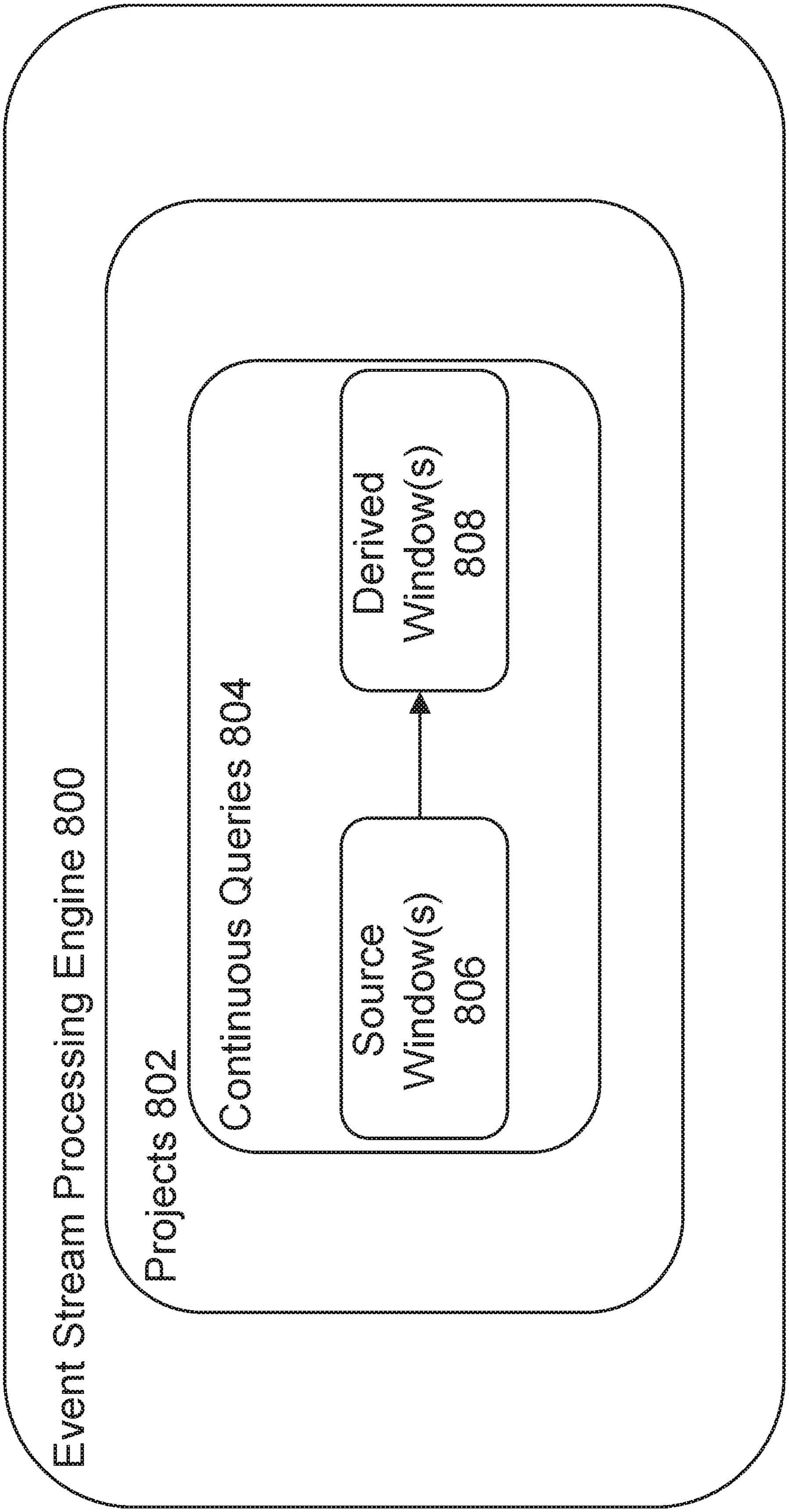
FIG. 8 illustrates a block diagram including components of an Event Stream Processing Engine (ESPE), according to at least one embodiment of the present technology.
Figure 9:
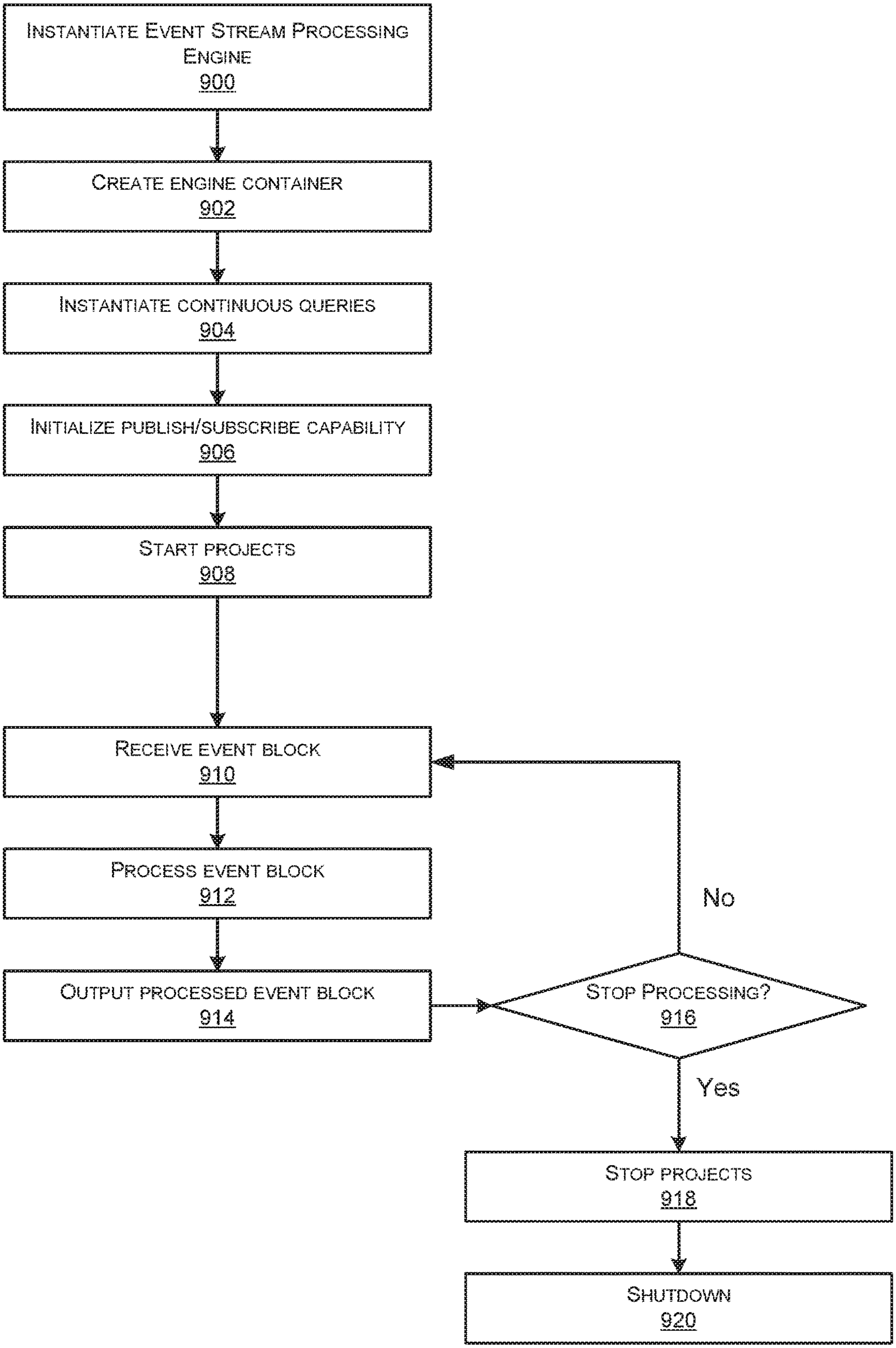
FIG. 9 illustrates a flow chart showing an example process including operations performed by an event stream processing engine, according to at least one embodiment of the present technology.
Figure 10:
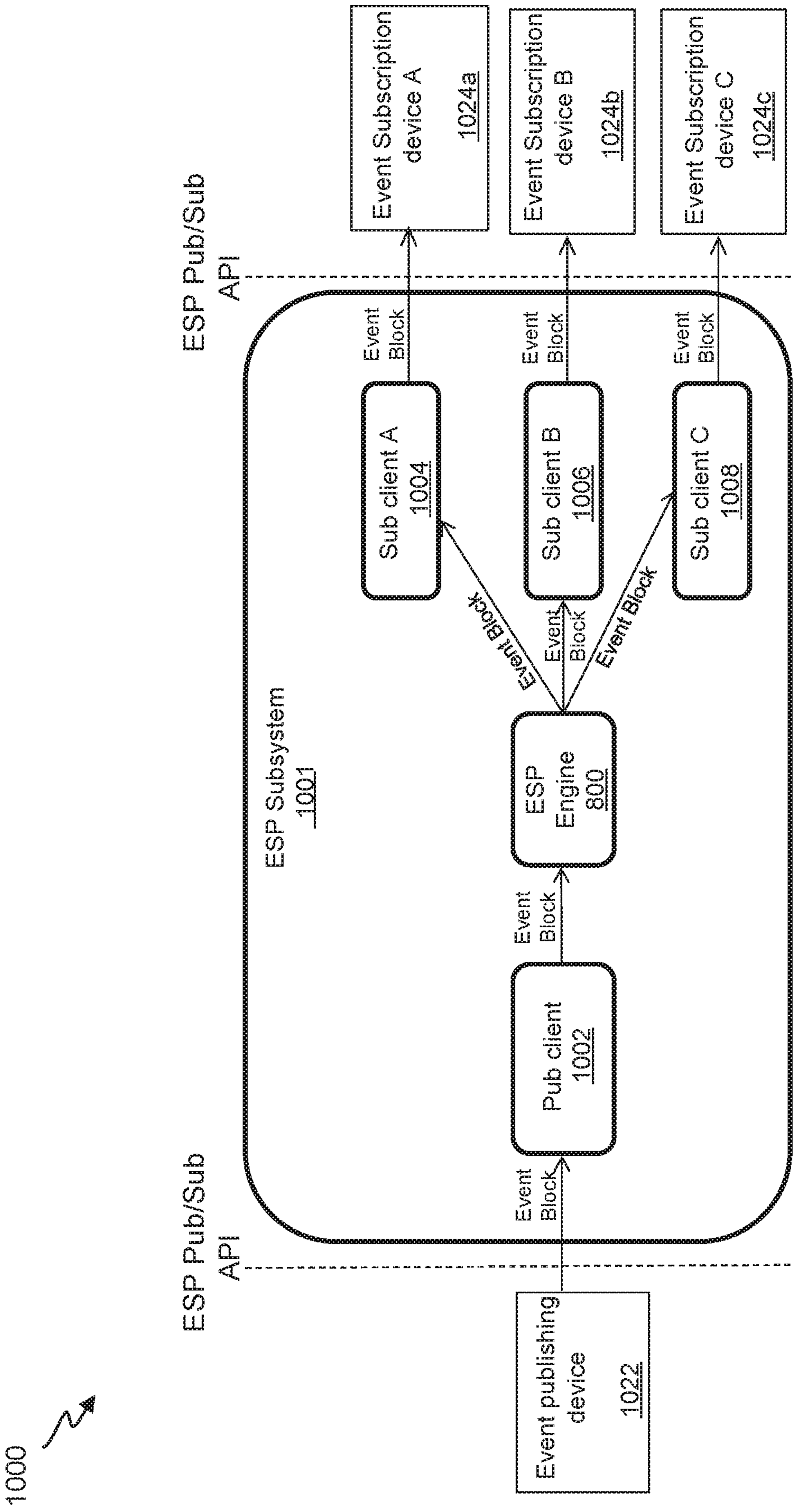
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
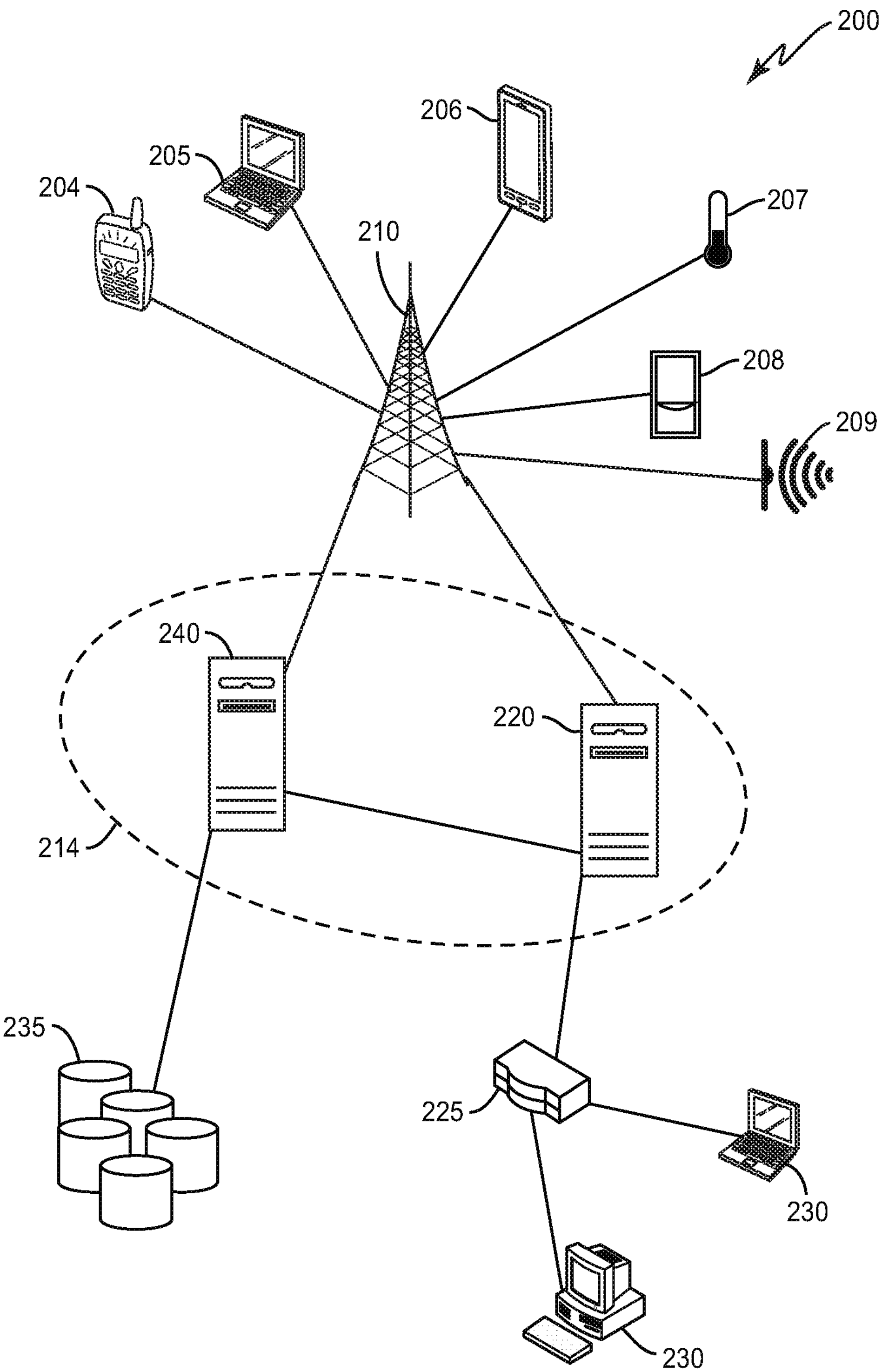
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
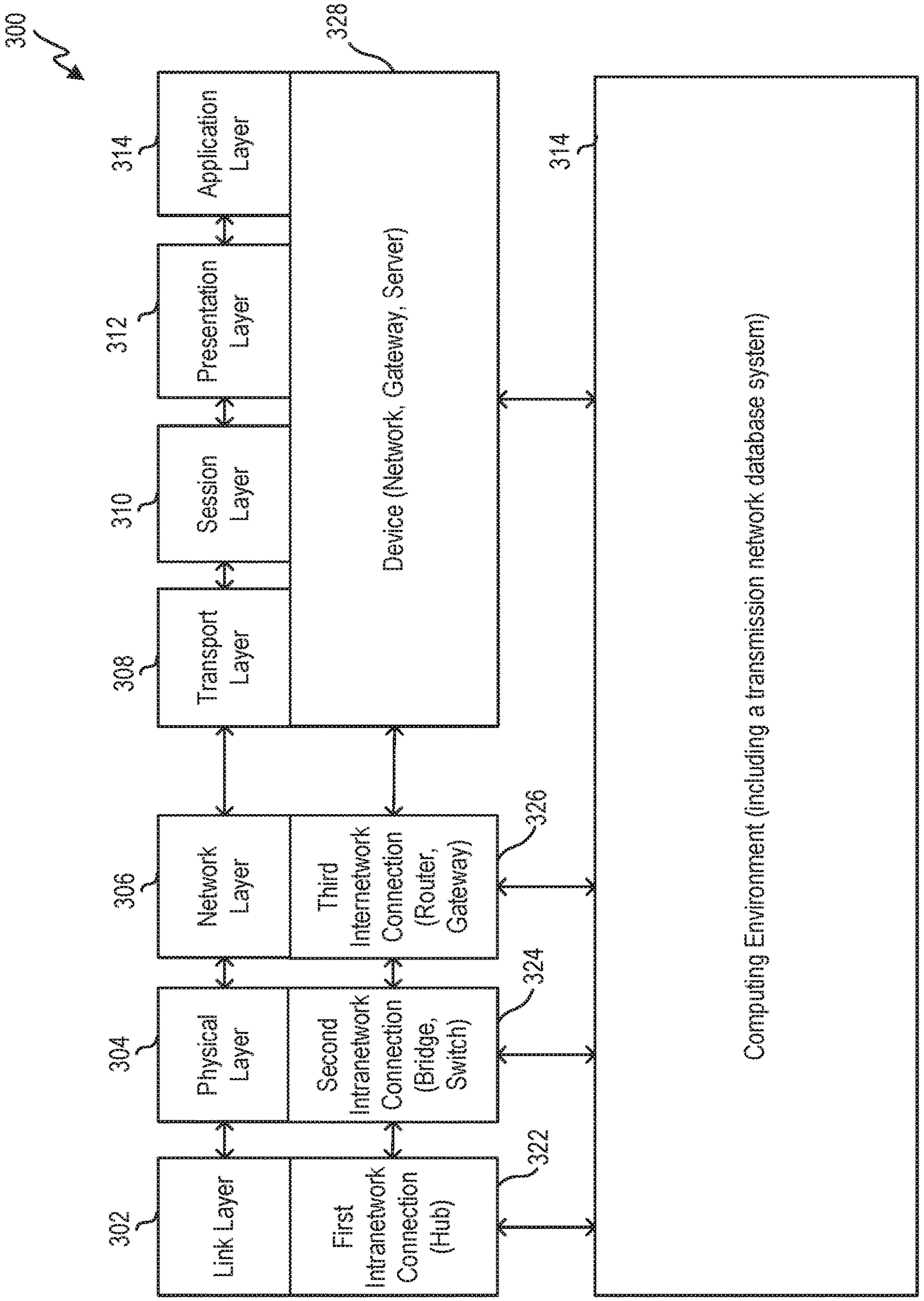
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
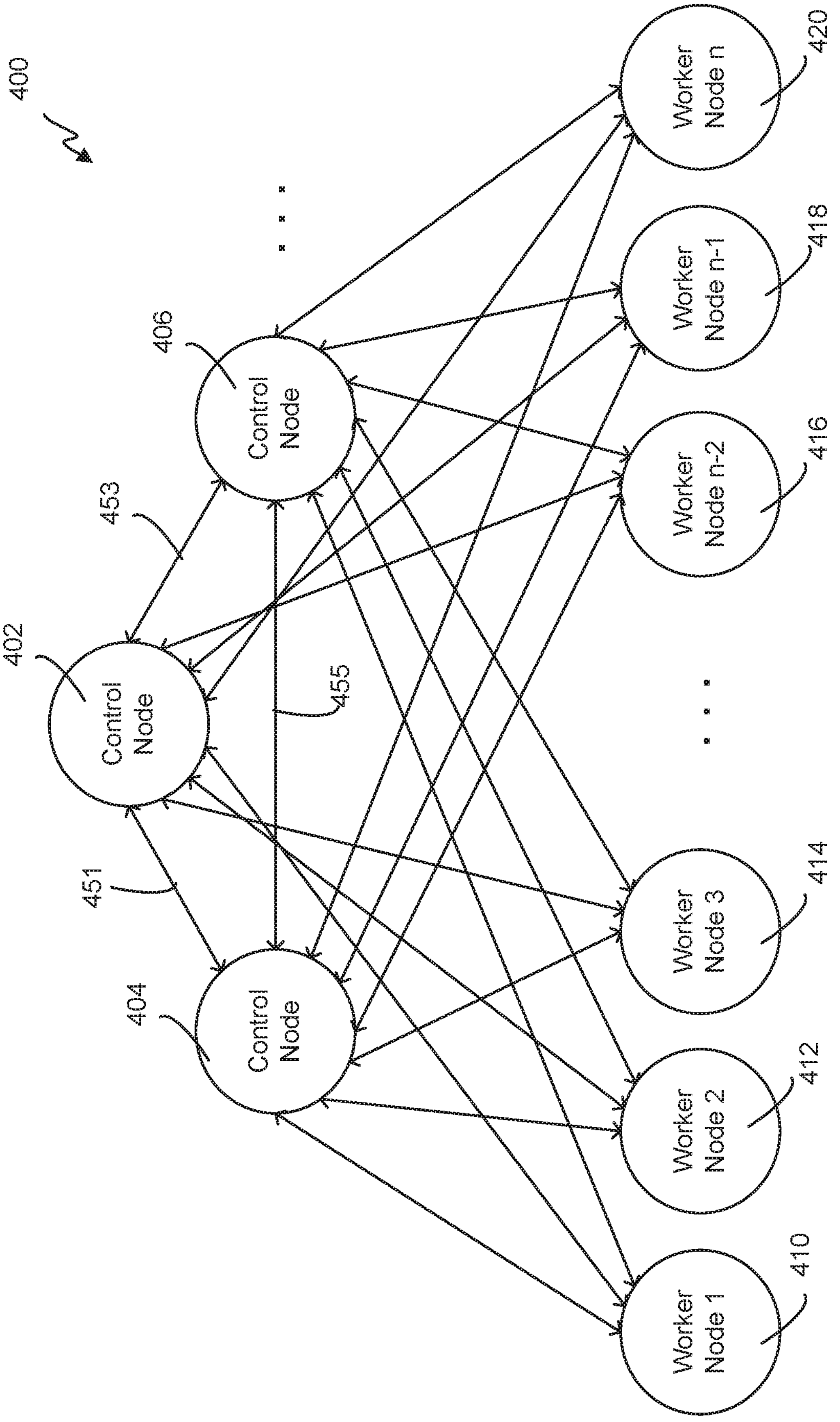
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
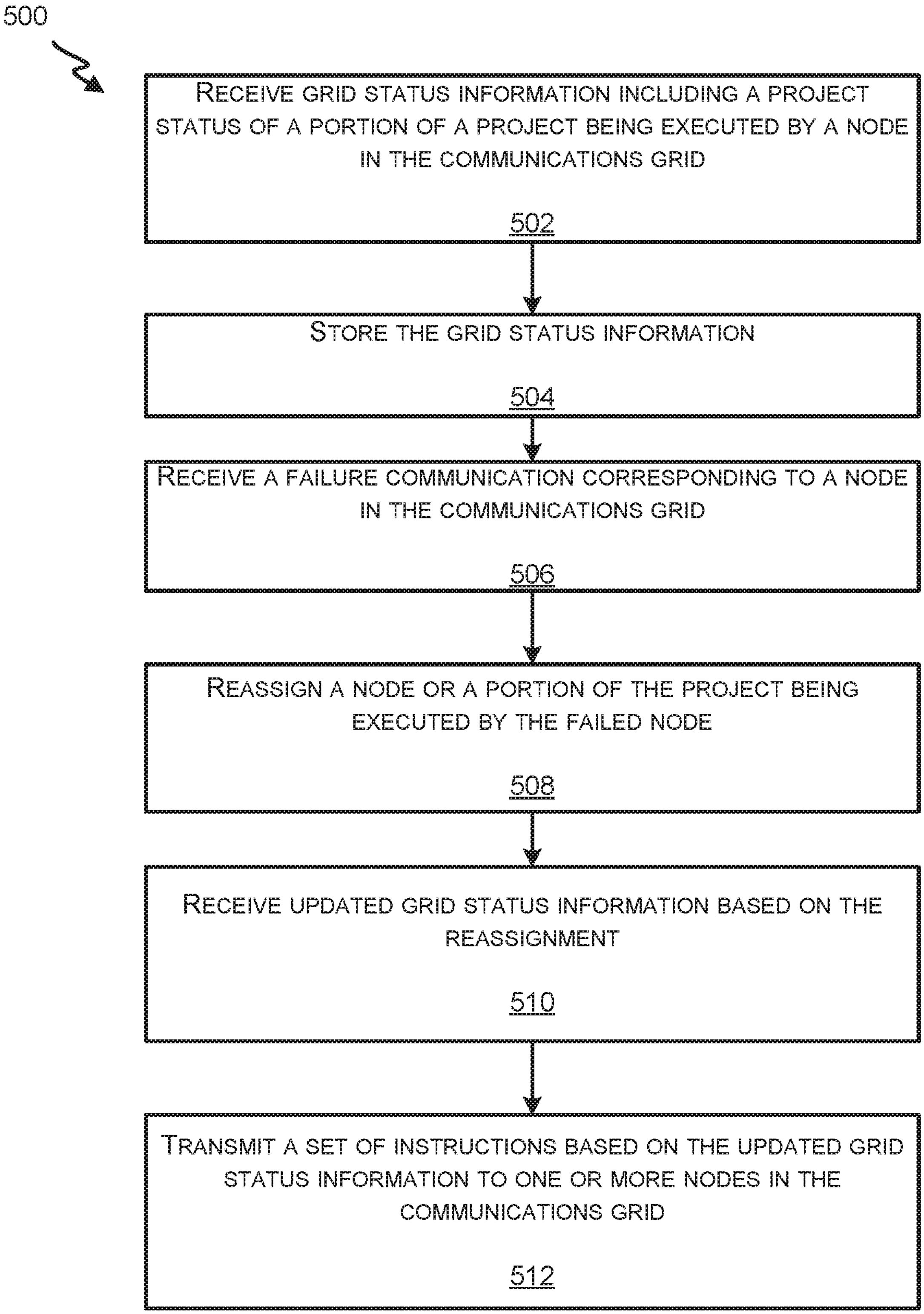
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
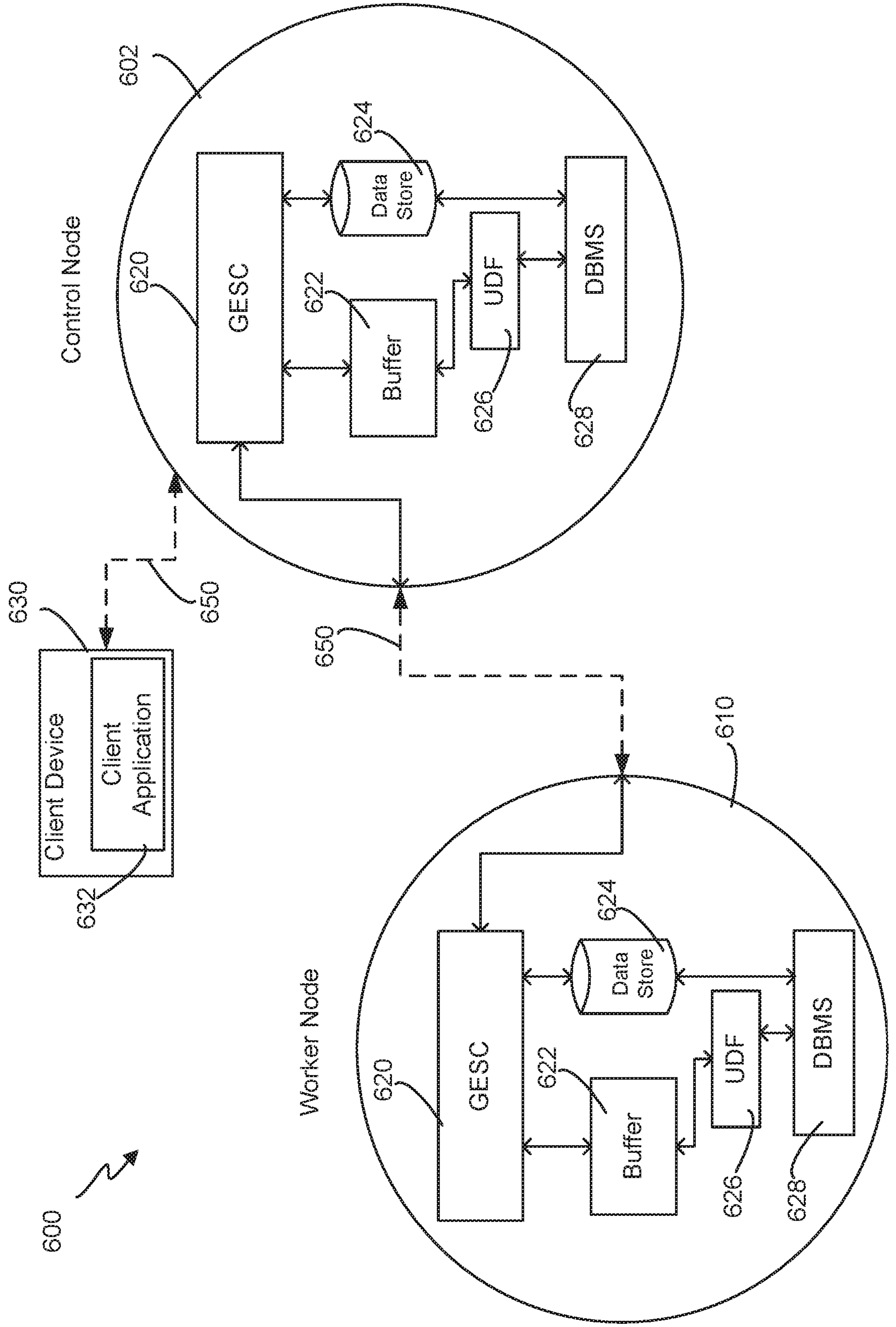
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
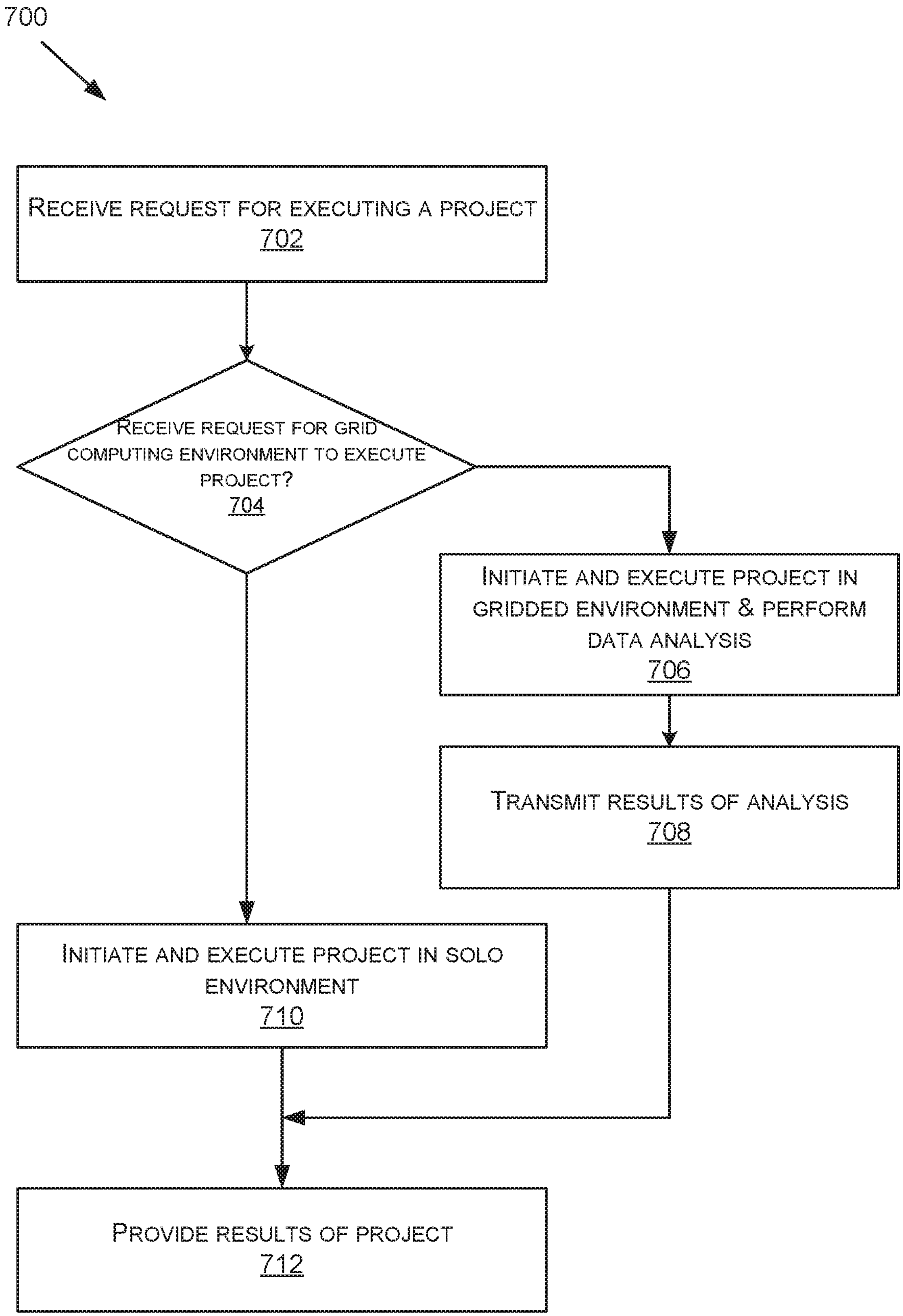
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
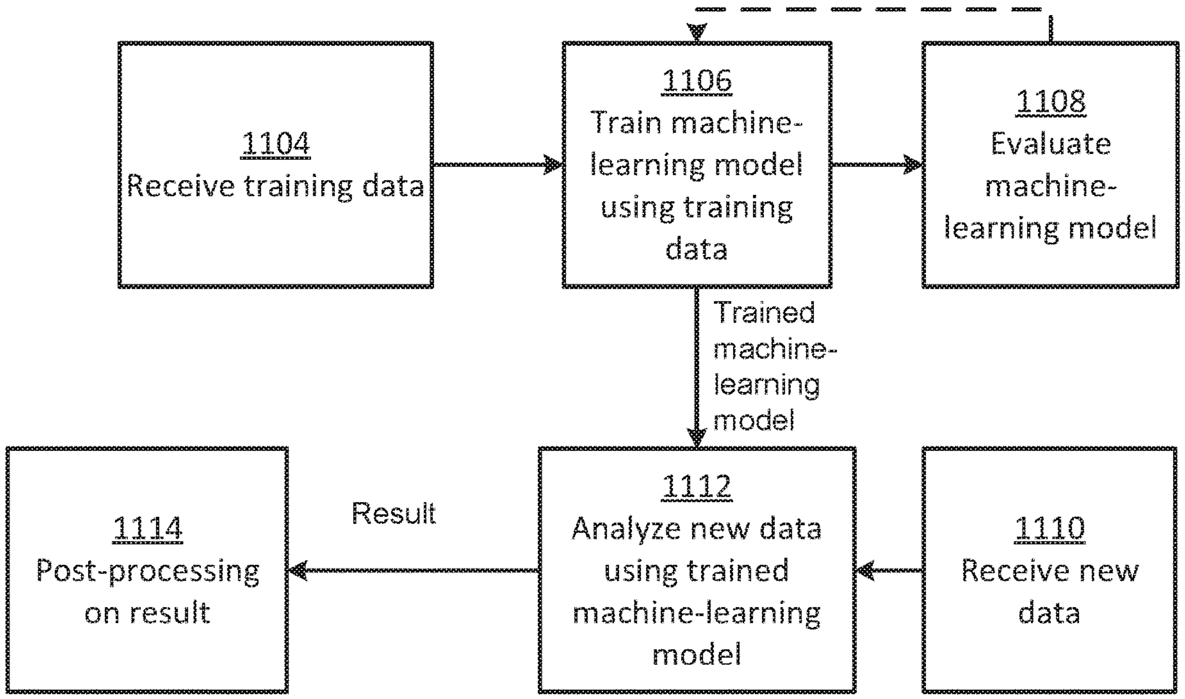
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
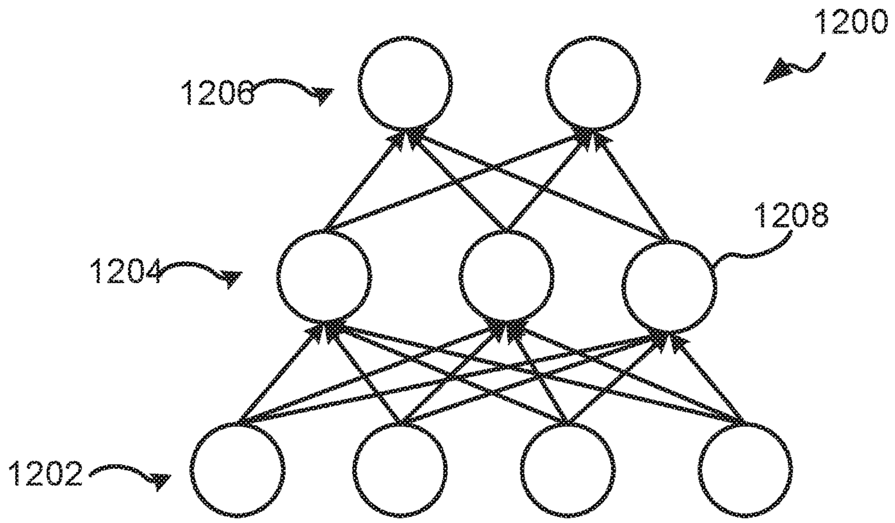
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Traditional computer models used to classify text information (i.e. text classification models) have target variables (for the models corresponding to classifications for the texts. A target variable could have several levels or options for the target variable. For example, a target variable for reviews may have options corresponding to a good service review, bad service review, good food review, bad food review, etc. In order to build the model two different approaches are traditionally used. In a first approach, a rule-based model is used (e.g., Text Rule Builder™ in SAS® Text Miner™ provided by SAS Institute Inc. of Cary, N.C., USA). A rule-based model can be used to identify terms in the text information and classify the data based on identified terms. In a second approach, a feature extraction and predictive model is used. This is a statistical approach that takes all the terms, translates them into numeric representation (e.g., 1000 words might each be represented by one of 100 numeric variables), and then uses a machine learning algorithm on the numeric representations to classify the data based on where the numeric representation appeared on a spectrum. For example, this approach may use a singular value decomposition (SVD) with a neural network model. However, with this second approach it is difficult for a user to interpret the model or understand why a classification got made.

Each of these models have advantages. With a rule-based model it is easy for a user to interpret how the model is working and the models often are faster in terms of processing data. While a rule-based model performs well for a target variable with many levels, a feature extraction and prediction model will often outperform a rule-based model (e.g., the rule-based model is less accurate in classification). However, the feature extraction and predictive model is not easily interpretable because it is difficult for a human user to understand the mathematical representation. Further, it often has longer run times that may lead to a potential failure in processing for a target variable with many levels. One or more embodiments described herein improve model interpretability and perform better than traditional rule-based models (e.g., by computing an aggregated model from generating multiple randomized sampling models).

Figure 13:
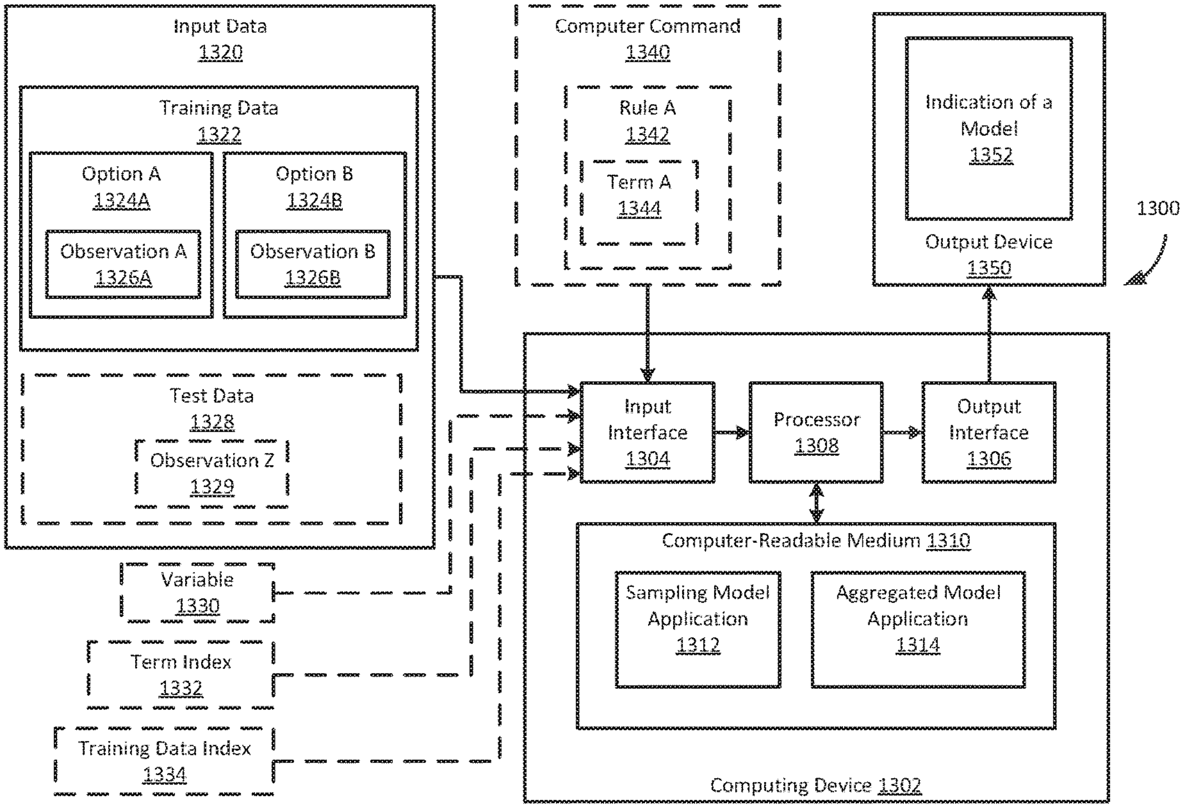
FIG. 13 illustrates a block diagram of a system for outputting an indication of a model in at least one embodiment of the present technology.

FIG. 13 illustrates a block diagram of a system 1300 of outputting an indication of a model 1352 (e.g., an aggregated model). System 1300 includes a computing device 1302. In one or more embodiments, the system 1300 includes one or more input devices for receiving, via one or more input interfaces 1304, input data 1320 for deriving a model. For instance, the computing device 1302 may receive training data 1322 for training or generating a model. Additionally, the system 1300 includes one or more output devices 1350 (e.g. one or more of display, printer, and storage devices) for outputting via one or more output interfaces 1306 an indication of a model 1352.

In one or more embodiments, the training data 1322 received by the computing device 1302 may represent different observations 1326. For example, the observations may be of text information (e.g., obtained from one or more electronic documents or from one or more recordings of human speech). The observations 1326 may be received from another computing system (e.g., from stored observations or sensor collected information) or can be manually input by a user of the system 1300 via an input device (e.g., a keyboard or touch screen for user entry of data).

In one or more embodiments, the observations 1326 are categorized into one of options 1324 for a target variable for a model. For example, if the model is a model used to classify electronic reviews into different review categories of good or bad reviews, option 1324A may classify observation 1326A as a good review and option 1324B may classify observation 1326B as a bad review so that a model can be generated to classify or predict a quality of future reviews. In this example, the options comprise two different options within a category for the target variable. However, more categories or options are possible for models in other examples. For example, if the category is a sentiment or an emotion of social medial posts, the options could be angry, sad, happy, apathetic, etc.

In the same or different embodiment, the input data 1320 may further comprise test data 1328 to test completed models. Accordingly, test data 1328 comprises observations 1329 similarly to observations 1326. However, the test data 1328 may not provide option assignments initially to the computing device 1302 to test the classification of computing device 1302 to various options 1324. In one or more embodiments, the computing device 1302 receives the test data 1328 where at least a portion of the test data represents an observation for a document or portion of a document that is classified into different options 1324.

In one or more embodiments, the computing device 1302 obtains one or more computer commands 1340. The computer commands 1340 can specify a rule for categorizing the input data 1320 into one of the options 1324 for the target variable. In one or more embodiments, the rule for categorizing are based on identifying one or more terms of input data 1320. For example, the rule could specify that if the observation of the text information comprises the term "tasteless" or "awful" the observation should be categorized as a bad review. The rules could involve several terms (e.g., joined by Boolean operators like "~" for a not operator or "&" for and operator). For example, the rule could specify to return "bad review" if the observation contains the terms "leave" and "pay" and does not contain the terms "delicious" "great" "love" or "always".

The computing device 1302 could receive computer command 1340 from an external device via an input interface (e.g., input interface 1304) or input device. Alternatively, the computing device 1302 may already have the computer command 1340 stored or may generate the computer command 1340.

For instance, the computing device 1302 has a computer-readable medium 1310 and a processor 1308. Computer-readable medium 1310 is an electronic holding place or storage for information so the information can be accessed by processor 1308 (e.g., stored computer commands 1340 or instructions for generating computer commands 1340). Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input interface 1304, with output interface 1306 and with computer-readable medium 1310) to receive, to send, and to process information.

In one or more embodiments, computer-readable medium 1310 stores instructions for execution by processor 1308. In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The applications can be written using one or more programming languages, assembly languages, scripting languages, etc. For instance, the computer-readable medium 1310 comprises a sampling model application 1312 for generating randomized sampling models or an aggregated model application 1314 for generating an aggregated model. The one or more application can be integrated with other analytic tools. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

For example, in one or more embodiments, the computer-readable medium 1310 comprises instructions for a sampling model application 1312. In one or more embodiments, the sampling model application 1312 comprises instructions for generating randomized sampling models. The sampling models may be randomized in that each of the sampling models of a set may be generated from a different subset of terms than other sampling models of the set. For instance, the sampling models may be randomized in that the sampling models are built on different sample training data which leads to randomness or unpredictability in the resulting sampling models. Alternatively, or additionally, the sampling models may be randomized in that the term sampling leads to randomness or unpredictability in the resulting sampling models (e.g., different sampled sets from the training data or different sampling amounts).

In one or more embodiments, the sampling model application 1312 comprises instructions for generating a sampling scheme to cause randomness in the process of generating the sampling models. For instance, in one or more embodiments, the computing device 1302 generates a sampling scheme for sampling terms of the training data 1322 according to the one or more computer commands 1340. For instance, the computing device 1302 may obtain various information for generating the sampling scheme.

In one or more embodiments, the computing device 1302 obtains a variable 1330 indicating a number of iterations for executing the sampling scheme or a number of sampling models that the sampling scheme should generate. Alternatively, or additionally, the computing device 1302 obtains one or more training data indexes 1334. Each index of the one or more training data indexes indicates a percentage of the training data. For instance, a training data index may indicate to sample 60 percent of the training data. Each sampling model however will sample different combinations of the data (e.g., a random selection). By sampling different portions of the training data, different models can be developed from the different portions. Alternatively, or additionally, the computing device 1302 obtains one or more term indexes 1332. Each index of the one or more term indexes indicates a percentage of terms (e.g., a random portion of all the possible terms across all the observations of the training data 1322). By sampling different portions of the training data, different models can be developed from the different portions.

The information may be obtained by receiving the information (e.g., from a user via an input device or from another computing system). The information may be obtained by selection of a default value stored at the computing device. The information may be obtained implicitly by obtaining a stored sampling scheme.

In one or more embodiments, the sampling model application 1312 generates randomized sampling models by, for N iterations of the sampling scheme, determining a respective subset of the training data 1322 based on a respective training data index 1334 of the one or more training data indexes; sampling, based on a respective term index 1332 of the one or more term indexes, the respective subset of the training data 1322 for a subset of terms identified in the respective subset of the training data according to the one or more computer commands 1340; and generating, based on the subset of terms, a respective sampling model, of a set of sampling models, for categorizing, according to the one or more computer commands 1340.

In one or more embodiments, the computing device has an aggregated model application 1314 for computing and outputting an aggregated model for categorizing, according to all the randomized sampling models, test data 1328 into one of the options 1324 for the target variable.

In one or more embodiments, the sampling model application 1312 or aggregated model application 1314 is used to output an indication of a model (e.g., an aggregated model). For instance, the computing device 1302 could output a classification according to a generated model (e.g., a classification of an observation 1329 of test data 1328 into a given option for the options 1324 for a target variable according to the aggregated model). It could also be used to output metrics pertaining to the generated model (e.g., the importance of rules or terms in the aggregated model, or a misclassification rate of the generated model).

In one or more embodiments, the aggregated model application 1314 has advantage not found in traditional approaches for generating a model. For example, the current Text Rule Builder™ uses a type of "boosted" machine learning approach (in boosting, unclassified examples get higher weight in subsequent iterations), whereas this approach is a type of "bagging" machine learning approach where different subsamples of the data and/or rules are examined in each bag. Unlike, Text Rule Builder™, this approach can be performed in parallel which has advantageous in processing and works well when run across a grid. It also gets better categorization accuracy in most cases.

In one or more embodiments, fewer, different, and additional components can be incorporated into computing device 1302. For instance, in one or more embodiments, there are one or more input devices or output devices. There can be one or more applications to implement embodiments described herein. As another example, the same interface supports both input interface 1304 and output interface 1306. For example, a touch screen provides a mechanism for user input and for presentation of output to the user. Alternatively, the input interface 1304 has more than one input interface that uses the same or different interface technology. Alternatively, or additionally, the output interface 1306 has more than one output interface that uses the same or different interface technology.

In one or more embodiments, the computing device 1302 or a computing system 1300 implements a method as described herein (e.g., a method shown in FIGS. 14A-14B) for outputting an indication of a model 1352.

Figure 14A:
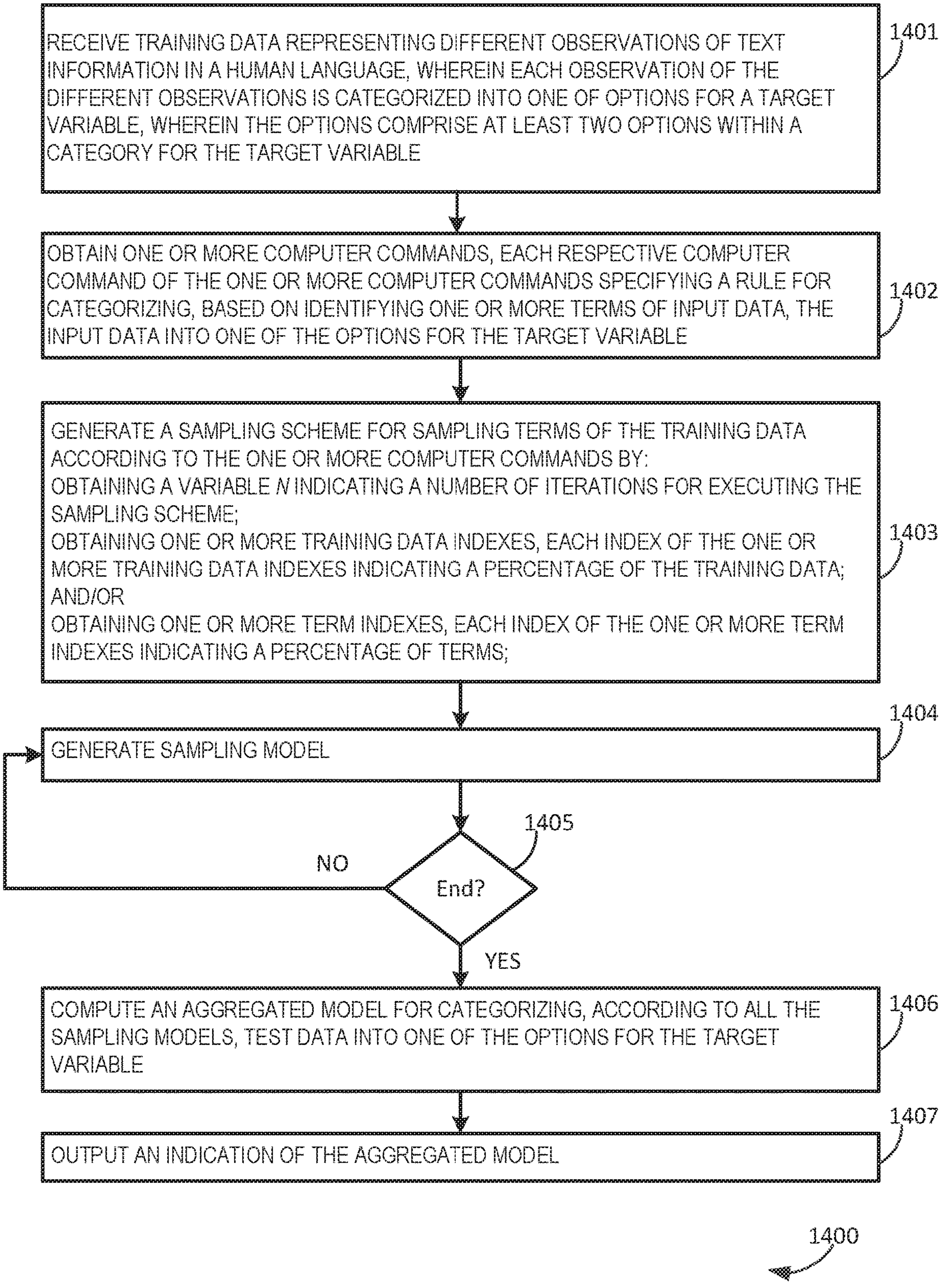
FIG. 14A illustrates a flow diagram for outputting an indication of a model in at least one embodiment of the present technology.

FIG. 14A illustrates a flow diagram of a method 1400 for outputting an indication of an aggregated model.

An operation 1401 of method 1400 comprises receiving training data representing different observations of text information in a human language. Each observation of the different observations is categorized into one of options for a target variable. The options comprise at least two options within a category for the target variable. In one or more embodiments, a computing device receives the training data by extracting from the observations, words from text information.

An operation 1402 of method 1400 comprises obtaining one or more computer commands. Each respective computer command of the one or more computer commands specifies a rule for categorizing, based on identifying one or more terms of input data, the input data into one of the options for the target variable. In one or more embodiments, the computer command specifies multiple terms a presence of which or absence of which must be identified to categorize the input data into a given option of the options for the target variable. For example, a computer command may specify to categorize an observation (e.g., a review) according to a first option for a target variable (e.g., a bad review) if the observation involves certain terms (e.g., the word "rude") and does not involve other terms (e.g., the word "delicious"). In one or more embodiments, the obtaining a computer command comprises multiple computer commands. For example, a second computer command may specify to categorize an observation (e.g., the review) according to a second option for a target variable (e.g., a good review) if the observation involves certain terms (e.g., the word "good") and does not involve other terms (e.g., the word "gross").

An operation 1403 of method 1400 comprises generating a sampling scheme for sampling terms of the training data according to the one or more computer commands by obtaining information regarding the sampling scheme. In one or more embodiments, the operation 1403 comprises obtaining a variable N indicating a number of iterations for executing the sampling scheme. In the same or different embodiment, the operation 1403 comprises obtaining one or more training data indexes. Each index of the one or more training data indexes indicates a percentage of the training data. In the same or different embodiment, the operation 1403 comprises obtaining one or more term indexes. Each index of the one or more term indexes indicates a percentage of terms. In one or more embodiments, the obtaining the information comprises a computing device selecting a predetermined default value for one or more of the variable N, the one or more training data indexes and the one or more term indexes. For example, the selecting may be in response to a user indicating to use a default value or failing to specify an alternative value. Alternatively, or additionally, a user of the computing device, may input a value for one or more of the variable N, the one or more training data indexes and the one or more term indexes.

In one or more embodiments, the method 1400 comprises generating randomized sampling models. For instance, an operation 1404 of method 1400 comprises generating a sampling model. An operation 1405 of method 1400 comprises determining whether the generating the sampling model should end. If no, another sampling model is generated. For instance, the operation 1405 could iterate through the N iterations of the sampling scheme obtained in the operation 1403. In one example, N is greater than 1, such that multiple randomized sampling models are generated. Once the process ends, e.g., once a computing device has iterated through N iterations, an operation 1406 of method 1400 comprises computing an aggregated model for categorizing, according to all the randomized sampling models, test data into one of the options for the target variable.

An operation 1407 of method 1400 comprises outputting an indication of the aggregated model. For instance, the indication could be the aggregated model, or it could be a score associated with the aggregated model (e.g., a misclassification rate). It could also be an indication of terms of the model or a score for one or more terms of the model (e.g., an importance score of that term in the aggregated model).

Figure 14B:
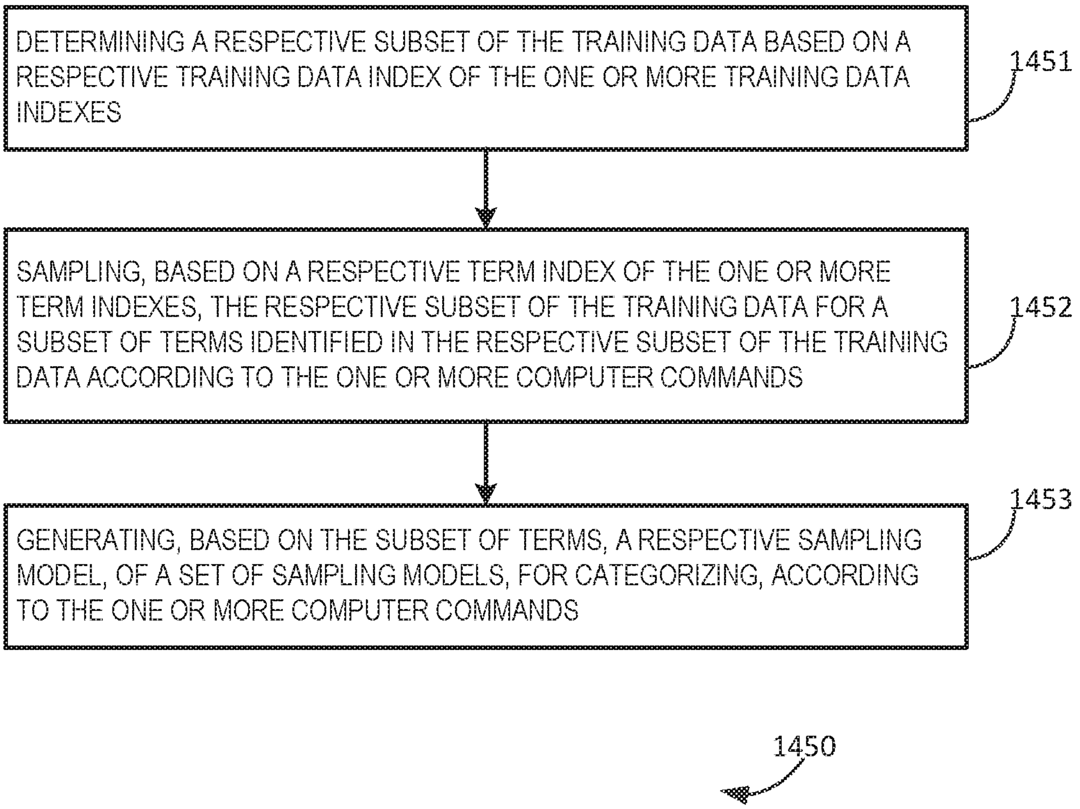
FIG. 14B illustrates a flow diagram for generating randomized sampling models in at least one embodiment of the present technology.

FIG. 14B illustrates a flow diagram of a method 1450 for generating randomized sampling models. For instance, in one or more embodiments, the method 1450 is performed in an operation 1404 of method 1400 and is repeated for N iterations of the sampling scheme.

An operation 1451 of method 1450 comprises determining a respective subset of the training data based on a respective training data index of the one or more training data indexes. For instance, a portion of the training data is randomly selected.

Figure 16:
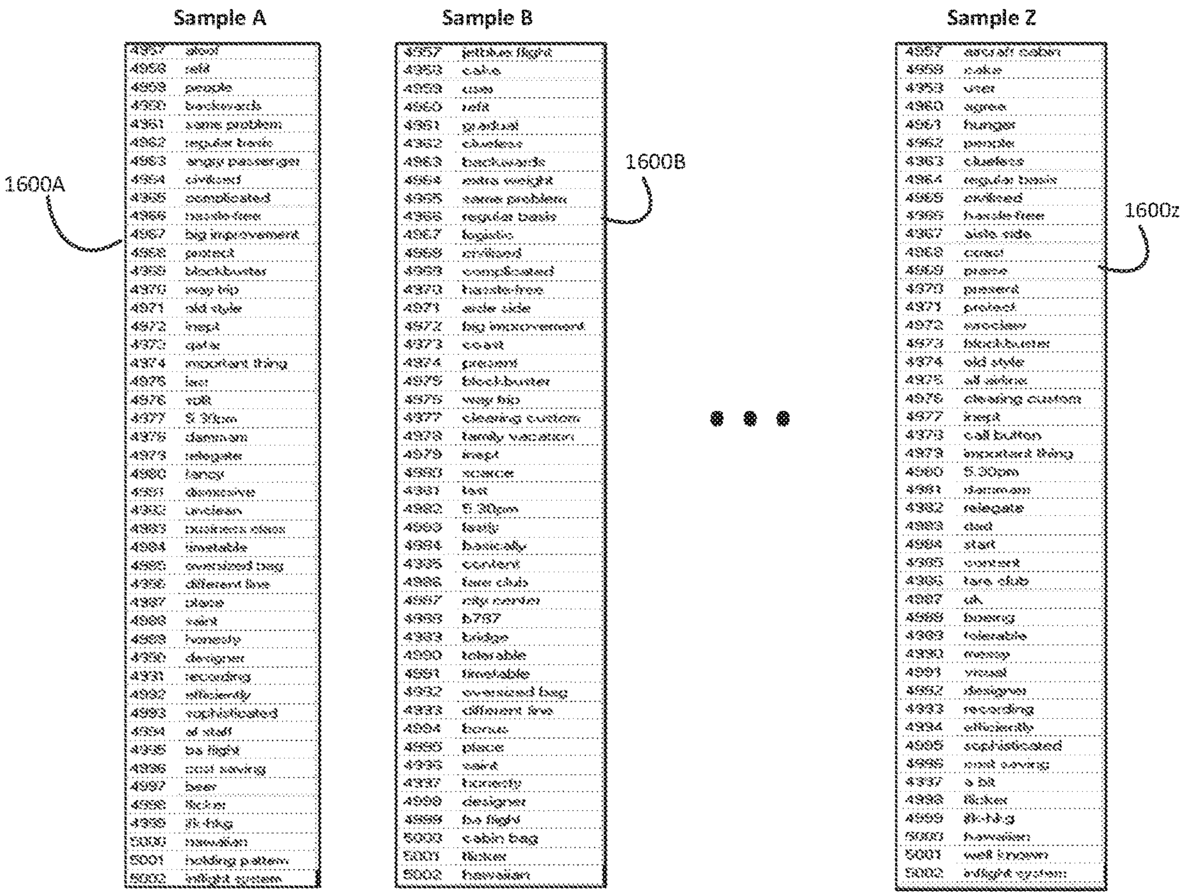
FIG. 16 illustrates example subsets of terms for different sampling models in at least one embodiment of the present technology.

An operation 1452 of method 1450 comprises sampling, based on a respective term index of the one or more term indexes, the respective subset of the training data for a subset of terms identified in the respective subset of the training data according to the one or more computer commands. For instance, FIG. 15 shows the end of a dataset 1500 comprising 8,989 possible terms that appear across all the observations of an example set of observations. As shown some terms in the dataset 1500 comprise single words or abbreviated words like "yummy" and "xmas" and some terms in the dataset 1500 comprise phrases like "young child". Of course, other terms or multiple terms are possible (e.g., functions to represent word combinations, root words that represent multiple different words). Further terms can be modified to find similar terms (e.g., putting all terms in lower case). FIG. 16 shows example samples 1600 taken using this dataset 1500 of possible terms (e.g., according to an operation 1452). This creates different samples. For instance, only sample 1600A comprise the term "aloof" and does not include "cake" found in Samples 1600B and 1600Z. The samples could comprise some terms the same. For instance, the samples 1600 each comprise the term "5.30 pm" and "hawaiian".

In one or more embodiments, the sampling the respective subset of the training data for a subset of terms comprises selecting random terms from the respective subset of the training data. However, sampling according to the sampling scheme need not be random. For instance, the sampling the respective subset of the training data for a subset of terms may comprise selecting terms of the subset of terms based on received weights for each of possible terms in the subset of the training data. For instance, a user may have knowledge about the importance of particular terms and may apply a weight to terms likely to be more important for consideration in modeling (e.g., synonyms for bad for selecting a bad review) to increase the probability that those terms are selected for a given subset.

An operation 1453 of method 1450 comprises generating, based on the subset of terms, a respective sampling model, of a set of sampling models, for categorizing, according to the one or more computer commands.

By having different subset of terms in different iterations of the method 1450, the method 1450 can be used to generate multiple randomized sampling models.

In one or more embodiments, a computing device (e.g., a computing device 1302), generates a respective sampling model by computing, for each option of the options for the target variable, a respective likelihood that the observation will be classified into a given option of the options for the target variable according to the respective sampling model.

One or of ordinary skill in the art will appreciate that the methods illustrated in FIGS. 14A and 14B can be carried out together or separately and in different orders. For example, operations 1401, 1402 and 1403 could be carried out in any order.

FIG. 17 illustrates example indications of an aggregated model built from training data comprising a document that is a review with different likelihoods for different options for a target variable that is the type of review. In this case the document is a good review. A computing device (e.g. computing device 1302) generates different models (m1-m3) for classifying the document as a good review or a bad review. A shown in table 1700, a first model (m1) classifies the document as having a 20% chance that it is a bad review and an 80% chance that it is a good review. A second model (m2) classifies it as having a 40% chance that it is a bad review and an 60% chance that it is a good review. A second model (m3) classifies it as having a 50% chance that it is a bad review and an 50% chance that it is a good review.

In a first approach, called a mean aggregation or mean ensemble, all of the probabilities of a bad review option are averaged, and all of the probabilities of a good review option are averaged as shown in Table 1710. In a second approach, called a maximum aggregation or maximum ensemble, a maximum probability of the bad review option is taken for the bad review option of the model and a maximum probability of the good review option is taken for the good review option as shown in Table 1720. One or more of these probabilities can be output as an indication of the model 1352. Alternatively, or additionally, an outcome for the model may be output as an indication of the model (e.g., the classification 1740 of input data according to the model), or an evaluation of the model (e.g., indication 1750 indicating whether the classification 1740 was correct).

For example, in one or more embodiments a portion of the test data represents an observation for a document or portion of a document. The computing device (e.g., computing device 1302) computes an aggregated model according to a maximum aggregation by selecting a maximum of a set of likelihoods (e.g. likelihoods shown in table 1700) comprising each respective likelihood for all of the multiple randomized sampling models for a given option of the options for the target variable; and assigns, to the aggregated model, based on the selecting, a likelihood for the given option. In another example, the computing device (e.g., computing device 1302) computes an aggregated model according to a mean aggregation by averaging from all the multiple randomized sampling models, each respective likelihood for a given option of the options for the target variable; and assigning, to the aggregated model, based on the averaging, a likelihood for the given option (e.g., 36.7% likelihood the review is a bad review).

In one or more embodiments, a particular model is weighted differently in forming an aggregated model. For instance, one model may have more manual rules than computer generated rules leading to the generated model. It may be better to apply a higher weighting to this type of model. In one or more embodiments, the models may be generated according to different sampling schemes, and a user may weight models that are generated with one type of sampling scheme different than another. For instance, model 1 used 70% training data index while the other models only used a 50% training data index, so table 1730 shows a higher weighting for model 1.

In one or more embodiments, a computing device (e.g., a computing device 1302) selects an index (e.g., a training data index or a term index) from different possible indexes (e.g., to adjust the sampling to an optimum sampling based on a particular target variable). For instance, the computing device receives training data by receiving at least two groups of training data, a model-generating training group and a performance-testing training group. The computing device obtains the one or more training data indexes or the one or more term indexes of the sampling scheme by generating testing models generated from sampling the model-generating training group according to different possible indexes for the one or more training data indexes or the one or more term indexes of the sampling scheme. The computing device tests a performance of the testing models at categorizing the performance-testing training group; and selects, based on the testing, a single index from the different possible indexes.

Figure 18:
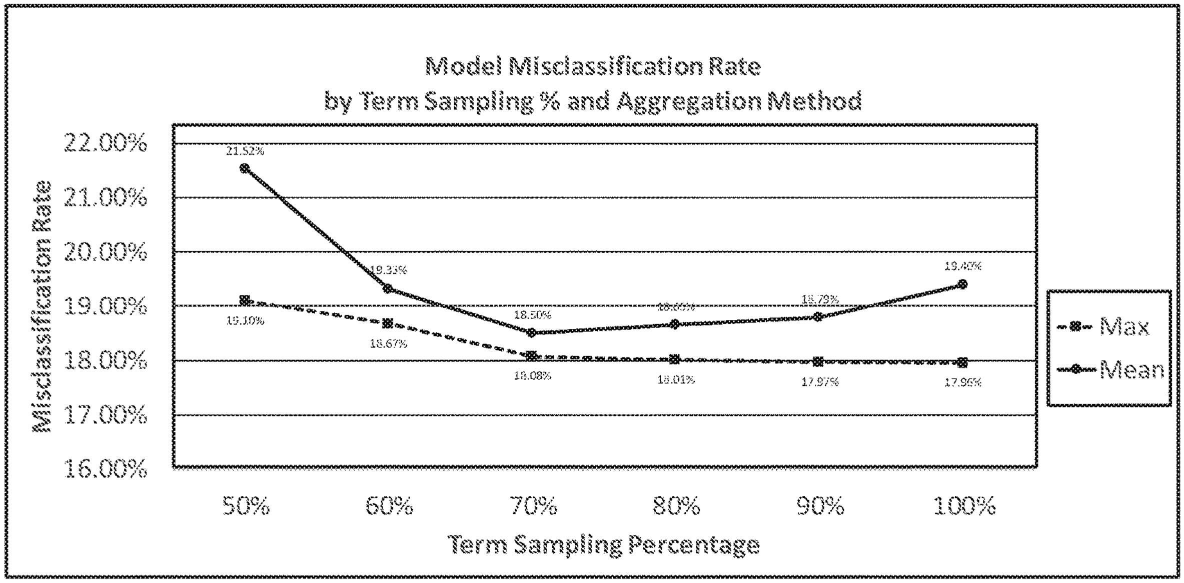
FIG. 18 illustrates example misclassification rates based on term indexes in at least one embodiment of the present technology.

FIG. 18 illustrates a graph 1800 with example misclassification rates based on testing different term indexes. In one or more embodiments, a given value for generating the sampling scheme is set by the user or by processing capabilities of the system (e.g., setting iterations based on run time). In one or more embodiments, an ideal value is selected for an application (e.g., by pretesting different sampling percentages). In the example shown in FIG. 18, training data was received comprising 27,482 different observations of mechanic notes that were classified into one of 10 different options. 50 models where generated using a training data sampling of 70%. The term sampling was adjusted between 50% to 100% to determine the best term sampling. The bottom axis of the graph 1800 is the term sampling percentages and the graph 1800 plots the misclassification rate for each of different term sampling matrix 50, 60, 70, 80, 90, and 100% used to generate the different models according to a maximum ensemble aggregation and a mean ensemble aggregation.

As shown the maximum ensemble aggregation generally performed better and the graph had slight improvements as the term sampling percentage increased. However, the mean ensemble aggregation generally performed better at 70 percent.

In general, across different types of data 70 percent was a good sampling amount for both training data indexes and term indexes. 70% provides some randomness to the input for creating different models each time. However, if an index is set you at a too low percentage, especially in a situation where there are a lot of levels, the sampling scheme is more likely to produce poor models because the sample may not be rich in important or key terms to derive the models. The sampling could also completely filter out documents classified by a certain level. For example, with the airline data, a computing system may filter out all or most observations for engine repair in one of the sampling sets, and the engine type target level the model will not be able to correctly classify. In one or more embodiments, the user may select a term index known to perform generally well without testing the different possible indexes or select a few index options to test.

In one or more embodiments, a user may use an autotuning tool, like a tool provided in SAS® Visual Data Mining and Machine Learning (VDMML) by SAS Institute, Inc. of Cary, N.C., to autotune the best index percentage.

In one or more embodiments, a computing device (e.g., a computing device 1302), computes the aggregated model by generating an output score for each term in the aggregated model that is a term in the multiple randomized sampling models. Each output score indicates an importance of a respective term in the aggregated model. One or more embodiments output an indication of the aggregated model by displaying the output score for each term in the aggregated model. Each output score could indicate model-level term importance or an observation-level term importance.

For instance, to indicate model-level term importance, a computing device could for each respective sampling model of the multiple randomized sampling models, compute a respective sampling score for each term of the respective model. The terms of the respective sampling model are identified according to the one or more computer commands for identifying terms. The respective sampling score indicates an importance of a respective term in the respective sampling model. The output score for each term in the aggregated model can then be based on the respective sampling score for each respective sampling model of the multiple randomized sampling models.

FIGS. 19A-19B illustrate example output of term scoring for model-level term importance. In one or more embodiments, a computing system (e.g., computing device 1302) outputs one or more terms of the model or a score for terms of the model. The data for the examples that follow are given in the context of restaurant reviews with target variable options of a good review. Embodiments are applicable to other contexts.

For term-model interpretability, every model iteration and rule can be examined. For instance, for every model that gets built, a computing device could derive one or more metrics on the classification of that rule (e.g., precision and recall measures). Precision is related to accuracy (e.g., how accurate is the rule at classifying) and recall is related to how well a rule works at capturing (e.g., how often is that rule used). For instance, if a rule classifies as a good review if the document mentions a good waiter, that might be a very accurate rule and have a high precision measure. However, if that rule is used infrequently and therefore does not capture many of the good reviews, it may have a low recall measure.

The precision measure and the recall measure may be represented numerically. For instance, 99% of the time the computing device captures a good review with the good waiter rule would be a measure of precision. If there are 1000 good reviews and only 200 of them mention a waiter than the recall would only be 20% of the time that rule is used. If a rule is very specific it may have a high precision measure but a low recall measure and so both factors can be considered in examining a rule.

In one or more embodiments, each rule leverages the term weight and the f1-score for that rule according to the equation:

$$f1 = 2 * \frac{\text{precision} * \text{recall}}{\text{precision} + \text{recall}}$$

In one or more embodiments, a computing system (e.g., computing device 1302) receives precision input for a given term of one or more computer commands (e.g., computer commands for classifying according to identified terms). The precision input indicates a precision score for a given rule specified by a computer command comprising the given term. The precision score indicates how precise the given rule was at categorizing the input data into options for a target variable. In the same or different embodiments, the computing system receives recall input indicating a recall score for the given rule. The recall score indicates how probable it is that the given rule categorizes input data according to the given rule. In one or more embodiments a computing system (e.g., computing device 1302) computes a given sampling score associated with a given term of sampling models based on the precision input and the recall input (e.g., a weighted f1 score).

FIG. 19A shows a table 1900 of weighted f1-scores 1902 for terms used in rules for classifying good reviews. By determining a score for a specific term (e.g., a weighted f1-score) an individual term's importance can be determined. For instance, a relative importance 1904 is determined that is the sum of a term's f1-score and its rule weight across all rules and models. For instance, if a rule uses two terms that must both be present (the score for each of those terms can be cut in half) to account for both of their importance to that rule. The weights are then standardized by the maximum weighted f1-score by a term for a given target to scale all terms from 0 to 1. In this example, the term "great" had the highest weighted f1 score, so it had a standardized relative importance of "1".

A given term could be used in multiple different rules. Like great could be used in many different observations and rules and models regarding those observations. For instance, the term "great" could be used in relation to "great service" "great food" "great pizza" etc. The weighted f1-score of 3.81 indicates the importance of that word across all the different rules and models. Standardizing the weights to arrive at a relative importance score conveys to the user in an easy to interpret form how important that term is. Different scales could be used (e.g. 0 to 2).

In this example, every level of the target variable has a unique set of scaled weighted terms. For instance, FIG. 19B shows a table 1950 of weighted f1-scores 1952 and relative importance 1954 for terms used in rules for classifying bad reviews.

In one or more embodiments, the user can use the model level importance scores to see if a model has picked up an undesirable term and see why that word is being associated with a particular target option for deciding whether to change the model (e.g. to exclude the term in a particular classification). A user can understand terms, which makes this type of output easier for a user to interpret. For instance, a good review could always mention a waiter "Chris". However, a user can understand that to apply the model to a different restaurant, this term should be excluded. The new restaurant may have a waiter named Chris, but that Chris might be a bad waiter.

It may also be useful to output information on an observation-level. For instance, this may help a user look at terms of the model with respect to a single document to understand why that document would be classified a certain way according to the model. A computing system can build a table that says this specific document #7 is a good review and it is a good review because the computing system identified the terms delicious and fun and a different document #17 is a bad review because the computing system identified the more important terms mediocre and bland, and other terms were of a lower level of importance.

For example, an observation could comprise documents or portions of documents. A computing device can, for each observation of the different observations, compute a respective sampling score for each term of a respective observation. The respective sampling score indicates an importance of a respective term in categorizing the respective observation into a given option for the target variable. Then an output score for each term in the aggregated model is based on the respective sampling score for each observation.

FIGS. 20A-20B illustrate example output of term scoring for observation-level term importance.

Observation-level term importance leverages the same principle as the model level term importance but only considers model rules specific to the observation instead of all possible rules. The weighted f1-score is calculated for the rules and terms and then standardized to scale between 0 and 1. A different scale could be used (e.g. −10 to 10).

FIG. 20A shows a table 2000 of different terms in a good review for a given observation that is a document (doc ID 7) and the terms respective importance. FIG. 20B shows a table 2050 of different terms in a bad review for a given observation (that is a text portion of a document with text ID 17) and its respective importance. As shown in the example, even though the term "mediocre" was very important in classifying for this particular text portion, it was not very important across all the models as shown in table 1950 of FIG. 19B. These different tables can therefore provide insight to a user in how the model is classifying across all the models and within an individual document or text portion.

FIG. 21A illustrates a table 2100 of example performance scoring for rules. In one or more embodiments, a rule specifies multiple terms a presence of which or absence of which must be identified to categorize the input data into a given option for a target variable. In this example, a computing device (e.g., computing device 1302) computes the aggregated model by generating an output score for each term in the aggregated model that is a term in the multiple randomized sampling models. The output score indicates an importance of a respective term in the aggregated model, the respective term weighted based on its relationship to other terms of its respective rule in the one or more computer commands (e.g. how many terms are in the rule). The computing device outputs an indication of the aggregated model by displaying the output score for each term in the aggregated model.

As shown in FIG. 21B, table 2150 illustrates example performance rule weighting for terms. In this case all the terms have a default weight of 0.5 because each of rules 1, 2, 4, 6, 8, 9 and 10 each specified two terms. If there were more terms, than the weight would decrease. Alternatively, the computing system or a user may know that a particular term carries greater importance and may assign a different weighting than a default weighting. For example, a noun may carry greater weight than a verb. A given terms weighted f1 score is then given by this equation:

$$\text{weighted } f1\text{-score} = (\text{Term Weight}) * (F1\text{Delta})$$

FIG. 22A illustrates a table 2200 with example output of term scoring for a sampling model according to this equation.

FIG. 22B illustrates a table 2250 with example output of term scoring for an aggregated model. Each of the weighted f1 scores in each of the models are totaled in a column 2252. The relative importance in a column 2254 of a term across the aggregated models can then be computed according to the below equation:

$$\text{relative importance} = \frac{\text{Weighted } f1 \text{ Score}}{\text{Maximum Weighted } F1 \text{ scores for a Target option}}$$

In one or more embodiments, a computing device (e.g., computing device 1302) displays, on a display device, a graphical user interface for selection of one or more variables or indexes for generating a sampling scheme.

Figure 23A:
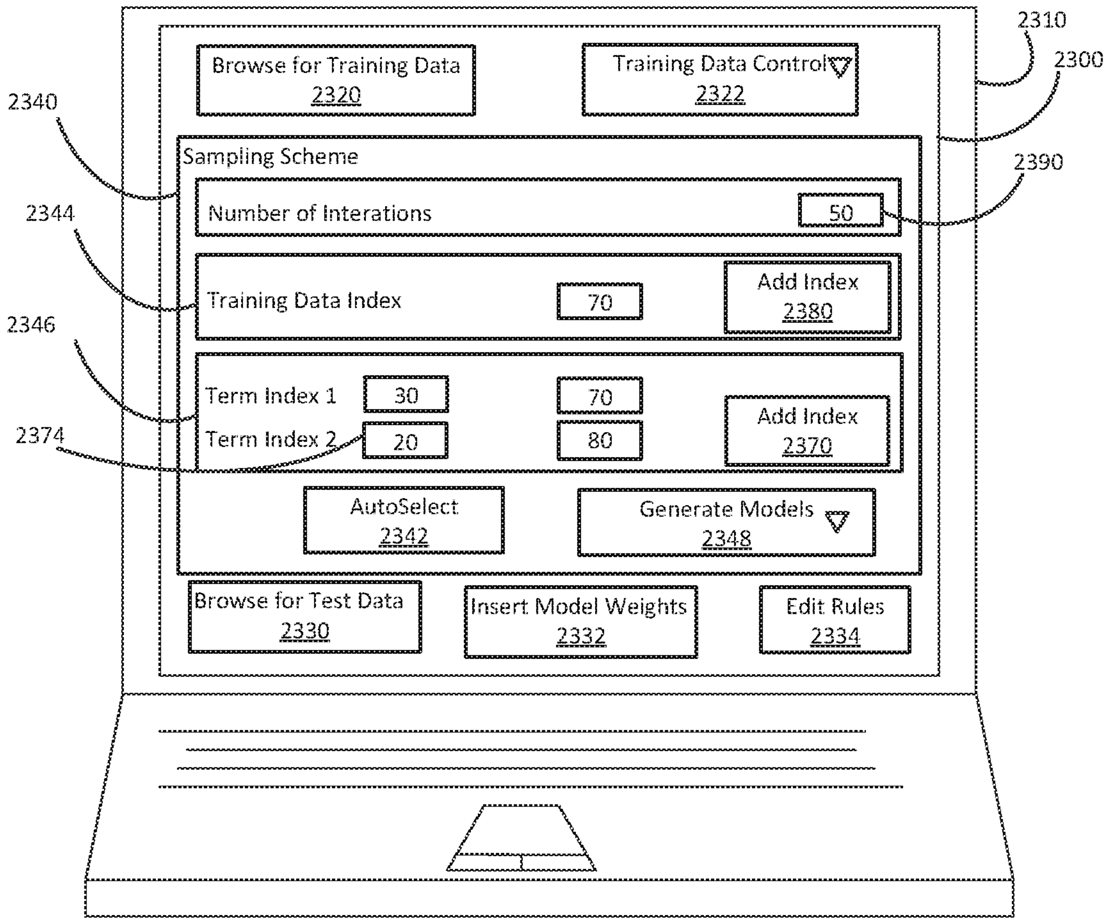
FIG. 23A illustrates an example graphical user interface in at least one embodiment of the present technology.

FIG. 23A illustrates an example graphical user interface 2300. The graphical user interface 2300 is displayed by a display device 2310 (e.g., output device 1350). In this case the display device 2310 also has controls for a user to interact with the graphical user interface 2300 and enter information (i.e. a keyboard and a touchpad).

In one or more embodiments, the graphical user interface 2300 provides a sampling scheme window 2340 for setting options for generating a sampling scheme when the user selects to generate a model using the generate models control 2348. In one or more embodiments, the generate models control 2348 provides options for selecting the particular approach for generating an aggregating model of the generated models (e.g., according to a maximum ensemble approach or a mean ensemble approach).

In one or more embodiments, a computing device displays on display device 2310, a graphical user interface 2300 for user selection of a variable in text box 2390 for controlling the number of iterations of the sampling scheme. In one or more embodiments, the computing device displays a default value (e.g., 50 iterations). Alternatively, or additionally the computing device provides an AutoSelect 2342 for autoselecting one or more values for generating a sampling scheme (e.g., using an autotuning algorithm to select an optimal number of iterations or portions for sampling). Alternatively, or additionally the computing device receives, from a user of the graphical user interface 2300, via one or more input devices, user input indicating the variable in text box 2390 (e.g., the user changes the default value).

In one or more embodiments, a computing device displays, on a display device 2310, a graphical user interface 2300 for user control of one or more indexes (e.g., a training data index control 2344 and a term index control 2346). In one or more embodiments, the user can add additional indexes for different models (e.g., using an add index control 2370 or 2380) such that the computing device displays multiple indexes for the one or more training data indexes or the one or more term indexes. In the example shown in FIG. 23A, the user has selected to have a second index for term indexes with different percentages given (e.g., some models for the aggregated model will be generated using a term sampling of 70% and some will be selected using 80%).

In one or more embodiments, a computing device, receives, from a user of the graphical user interface 2300, via one or more input devices, user input indicating the user selection of the multiple indexes. The multiple randomized sampling models comprise at least one model corresponding to a respective index of the multiple indexes. For instance, the models sampling scheme could alternate between the different modeling approaches or additional text boxes can be displayed to select the portion of models that will be according to the different sampling amounts (e.g., text box 2374 shows a selection of 20 models at 80%).

In one or more embodiments, a computing device displays other controls for generating the models (e.g., browse control 2320 for browsing within computer files for training data).

In one or more embodiments, a computing device displays other controls for working with generated models. For instance, the graphical user interface 2300 provides a browse control 2330 for selecting test data for testing the models. Additionally, or alternatively, the graphical user interface 2300 provides an insert model weight 2332 for weighting different generated models. For instance, the computing device could receive one or more weights indicating to weight different models of the multiple randomized sampling models differently in computing the aggregated model. Additionally, or alternatively, the graphical user interface 2300 provides an edit rules control 2334 for editing rules pertaining to a generated model (e.g., to control computer commands).

In one or more embodiments, the computing device receives an indication from a user of the display device that the classification according to the aggregated model is incorrect (e.g., using training data control 2322). In response to the indication, the computing device generates new training data from the observation for updating the aggregated model with a new sampling model based on sampling a subset of data comprising the new training data (e.g., by updating the training data to include the test data with a correct classification). Alternatively, or additionally, the user may receive an indication indicating to review one or more computer commands for updating the model (e.g., using the edit rules control 2334).

For instance, it may be useful to control the computer commands in situations in which a computing system generated the computer commands and a user would like to control the generated computer commands (e.g., in response to misclassified observations). It may be useful to control the computer commands where a computer device outputs an indication of an aggregated model by displaying on a display device a score for one or more terms identified based on or correlated with the computer command(s). The score could be a score for the aggregated model (e.g., a misclassification rate) or the score could be a feature score indicating features of the rule in the aggregated model (e.g., how useful that rule was at classifying or how often that rule is used for classifying). In one or more embodiments, multiple scores are provided, or a score represents a combination of features.

For instance, a computing system (e.g. computing device 1302 or display device 2310) may receive training data from a training data set for a machine learning algorithm. The computing system may obtain the one or more computer commands by generating them using the machine learning algorithm. The computing system may output an indication of the aggregated model by displaying on a display device a score for one or more terms identified based on the one or more computer commands. In response to the indication of the aggregated model, the computing system could receive an indication (e.g., from a user of the display device 2310) indicating to remove a given computer command of the one or more computer commands for categorizing subsequent input data.

Figure 23B:
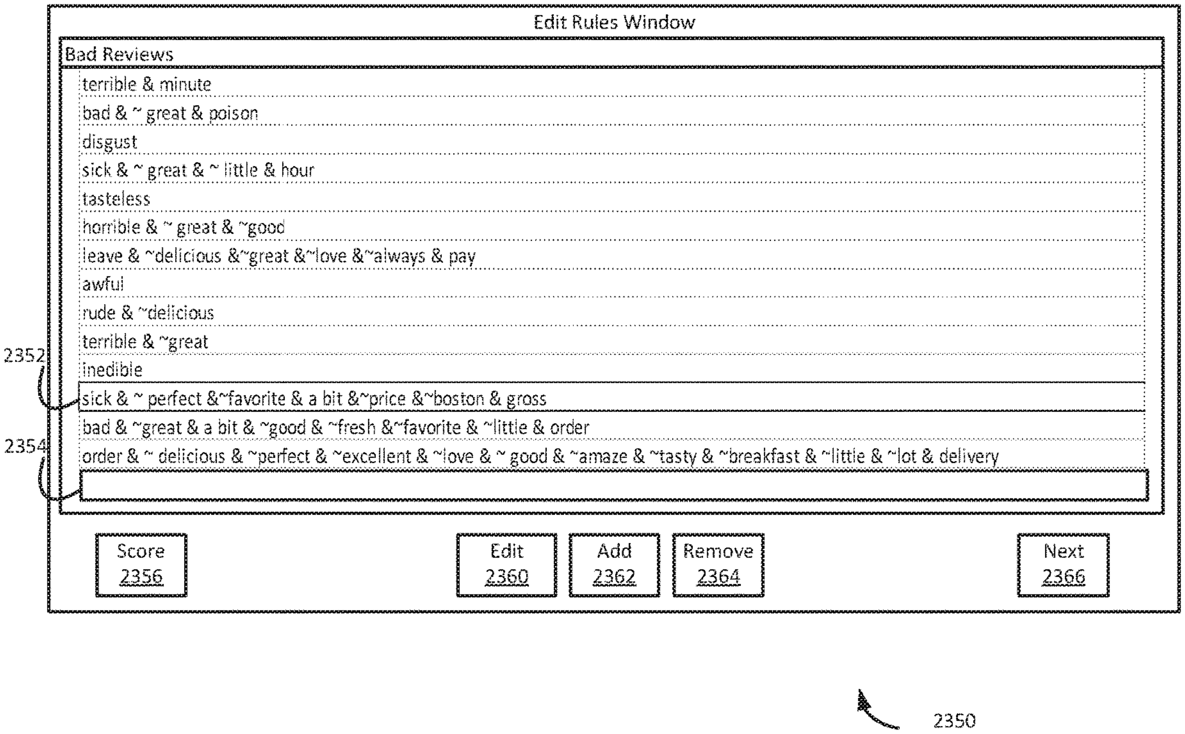
FIG. 23B illustrates an example graphical user interface for editing rules of a aggregated model in at least one embodiment of the present technology.

FIG. 23B illustrates an example edit rules window 2350 for editing rules of an aggregated model. The edit rules window 2350 may be a part of a graphical user interface (e.g., graphical user interface 2300). In this example, the set of rules generated by an aggregated model is for classifying restaurants into good or bad reviews. The edit rules window 2350 shows the rules for classifying a bad review. A user may be able to select a rule and edit or remove that rule. For example, the selected rule 2352 requires the rule to not contain the word Boston. This rule may need to be edited to remove Boston from the set or the rule entirely. For instance, a user may know that a Boston crème pie gave everyone food poisoning during the period of collecting the training data. This event tainted the training data, and this would not in future be a good rule for classifying data. The user may select the selected rule 2352 and use the edit control 2360 to edit the selected rule 2352 in the text box 2354 (e.g., to remove "Boston") or the remove control 2364 to remove the selected rule 2352 from the set. Alternatively, the user can use the text box 2354 and the add control 2362 to add a rule to the set that the model may have missed or a more sophisticated rule like "bad next to review". The graphical user interface may display a score 2356 to help the user in editing the rule set (e.g., a feature score related to the selected rule 2352 or an aggregated model score). The user may have navigation controls like next control 2366 to look at other rule sets for other options for a target variable or other target variables.

In one or more embodiments, the computer commands specify a rule for categorizing based on a given extracted word's relationship to one or more words in the information. For example, only return a bad review if the word "rude" is present but not delicious. In some embodiments, the computing device may generate generated data indicating a relationship of a first word to other words in the text information. For example, the generated data may indicate a part-of-speech of the first word, a dependency of the first word on the other words, or a frequency of the first word in the input data. In one or more embodiments, a computer command specifies a rule for categorizing based on a given extracted word's relationship to one or more words in input data (e.g. within text information).

Alternatively, the computing system itself may auto adjust these rules (e.g., randomly removing rules to see if it would improve the classification rate on subsequent input data).

Figure 24:
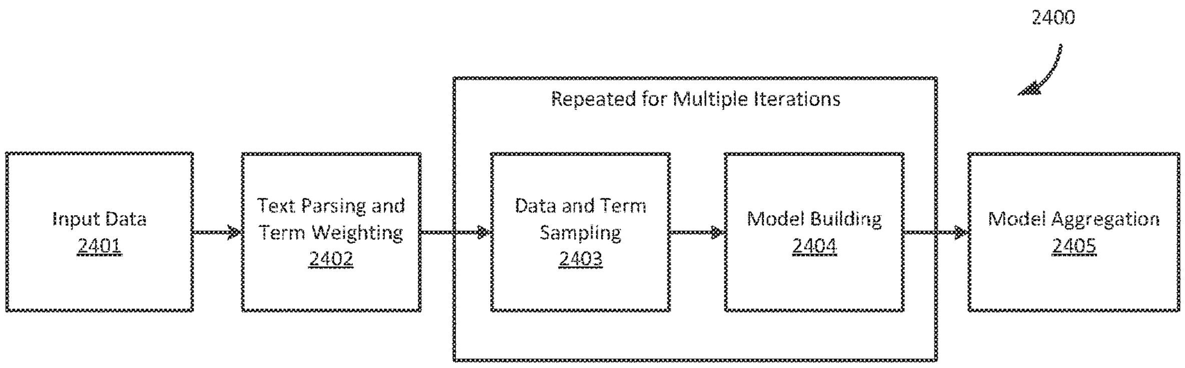
FIG. 24 illustrates an example flow diagram for generating a model aggregation in at least one embodiment of the present technology.

FIG. 24 illustrates an example flow diagram with a method 2400 for generating a model aggregation. The method 2400 could be implemented by a computing device 1302 or system 1300 described herein.

In an operation 2401 input data is received. For instance, the input data could be a full set of all the text documents. In an operation 2402, the text from the input data is parsed and terms in the text are weighted. For instance, SAS® Text Minor™ provided by SAS Institute, Inc. of Cary could be used break the document apart word-by-word providing a list of words. The words could be labeled with attributes, such as part of speech (noun, verb, adjective). Words could be broken down to their root word (e.g., running, ran, run all have the same root word). Text terms could be weighted based on how frequently a term is used across the input data or a subset of the input date (e.g., a whole document). Weights could be adjusted to discount frequent words that are not very valuable in terms of information (e.g., the, or, and a are used a lot in speech, but are not very valuable).

In an operation 2403 data and term sampling is performed to take a selection of the input data and a different selection of the terms and build a base model in an operation 2404. Operations 2403 and 2404 are repeated multiple times with different samples of the data using different terms each time. Then in an operation 2405, a model aggregation operation is performed where different models built (e.g., 50 models) are combined into one single model to provide a single output. Model aggregation also combines all term information that explains why a selection was chosen to a single piece of information that can be provided to a user for interpreting the model.

As one example, multiple text rule models are ensembled to improve upon the performance of a single rule model or other machine learning techniques, while still allowing for easy to interpret models. For each rule builder model, a different random sample of the training data is used for modeling. In this example, samples have ranged from 60% to 100%. At 100%, no sampling of the data is performed because all of the data is considered. Each rule builder model also samples the potential input terms used in the modeling. In this example, the sampling ranged from 50% to 100% sample of the terms.

Table 1 shows examples of how the model performs against some of the other typical traditional models using different data sets. For smaller data sets (i.e. lower observations) there were large improvements for a misclassification rate, but there were still improvements for larger data sets and the models. In a first example, restaurant review data was used with 13,075 reviews. The restaurant review data and airline review data were classified into two target levels (e.g., a good review or a bad review). In another data set mechanic notes where reviewed that could be classified into one of 36 different options.

TABLE 1

| | Restaurant Data | Airline Review Data | Mechanic Notes |
|---|---|---|---|
| Observations | 13,075 | 15,531 | 36,541 |
| Target Levels | 2 | 2 | 36 |
| Relative Improvement | 13.1% | 7.5% | 7.3% |

Table 2 shows example performances of embodiments described herein compared to traditional models. A misclassification rate was measured for each of different example models using a mean ensemble aggregation and a maximum ensemble aggregation. In each of the examples, 50 sampling models where generated, with 70 percent training data sampling and 50% term sampling. These methods are compared to traditional models: a text rule builder method and a Singular Value decomposition (SVD) with a random forest learning method. As shown in Table 2, across these different types of data, at least one of the improved methods provided the lowest misclassification rate, which means they generally provided models that where better at classifying the data. Even aggregation approaches that performed poorly compared to another aggregated approach at worst performed on par with traditional models.

TABLE 2

| | Restaurant | Airline Review | Mechanic Notes |
|---|---|---|---|
| Text Rule Builder | 17.23% | 17.66% | 27.59 % |
| SVD + Random Forest | 18.32% | 14.68% | 31.99% |
| Mean Ensemble Aggregation | 15.49% | 13.58% | 27.88% |
| Max Ensemble Aggregation | 14.97% | 14.69% | 25.80% |

These models may also be improved by finding an ideal sampling percentage. For example, with respect to the mechanic notes, by increasing the term sampling from 70% to 80%, the misclassification rate for the mean ensemble aggregation improved from 27.88% to 27.50% and the misclassification rate for the maximum ensemble aggregation improved from 25.80% to 25.58%.

Figure 25A:
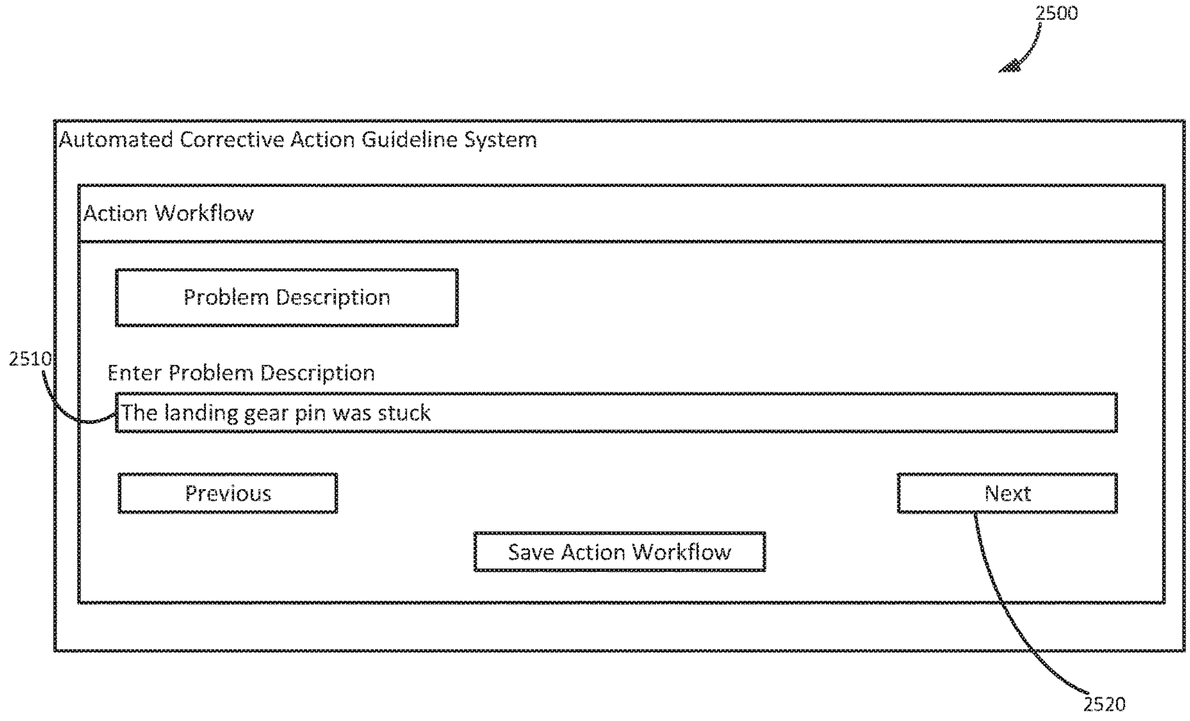
FIGS. 25A-25C illustrate example graphical user interfaces for using an aggregated model in at least one embodiment of the present technology.
Figure 25B:
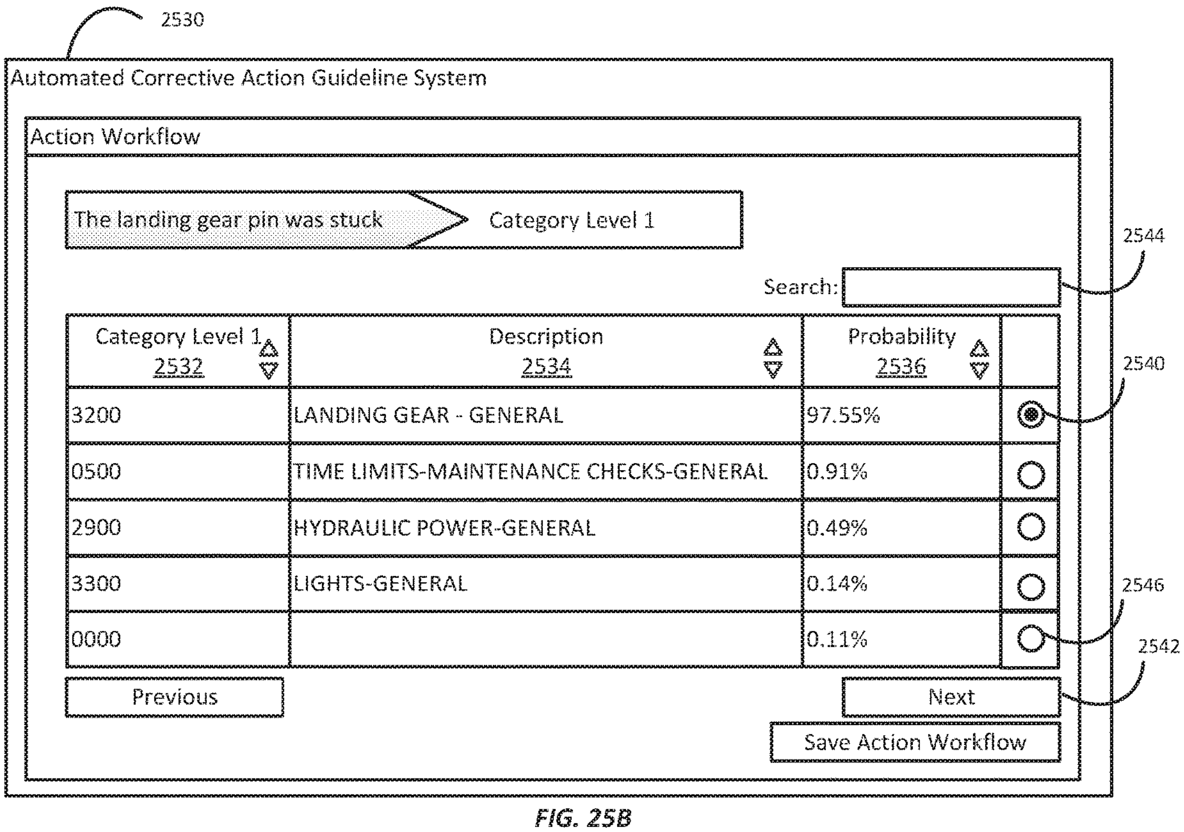
Figure 25C:
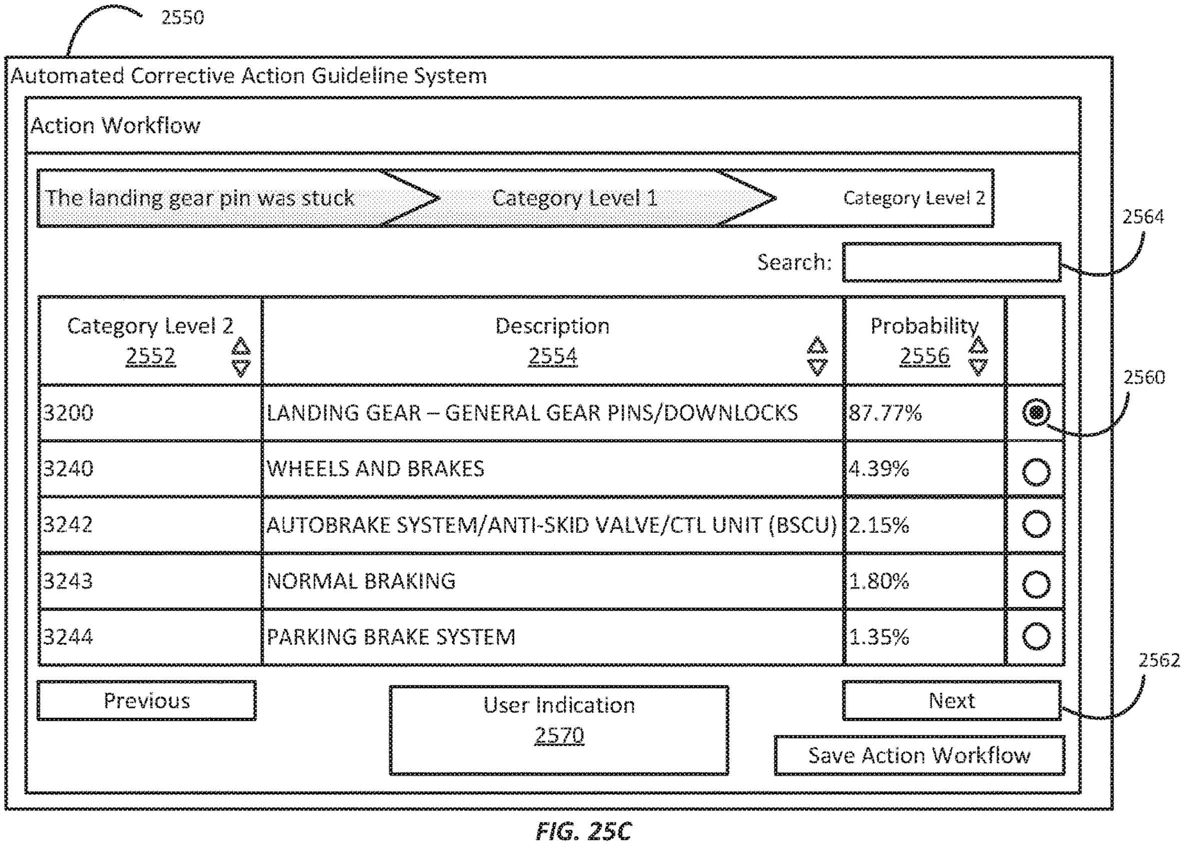

Embodiments described herein can be used for dealing with any kind of text representation (e.g., text documents, social media posts, recordings from call center nodes) that needs to be classified into the appropriate category. FIGS. 25A-25C illustrate example graphical user interfaces based on mechanic notes regarding airplane maintenance or errors, as an example. In this example, the mechanic records a note in a graphical user interface 2500, and it gets classified by a computing system into what type of issue or repair is needed on the airlines—engine related, landing gear related, or even more specific than that. A model could be built and then as a mechanic types in their notes, as soon as they do that the model could in real-time predict what type of error is associated with that problem and the probability associated with it. As shown in FIG. 25A, the mechanic has started entering a problem description that "The landing gear pin was stuck" in a text box 2510.

In this case, the mechanic can hit a next button 2520 to have another graphical user interface display with example errors for classifying that problem. Alternatively, the errors could display in the same graphical user interface 2500.

FIG. 25B shows an example graphical user interface 2530. The first target variable corresponds to the category of level 1 and has options shown in column 2532. The user can scroll through these different options to find an appropriate description shown in column 2534. A probability for each of the different options is shown in column 2536. The probability can indicate how likely it is that the model will classify that problem in a particular option. This can be used to display to the user the most likely classifications. Here the user selects option landing gear-general with the selection 2540. Other controls could be provided to help the user make selections (e.g., a text box 2544 for searching amongst the classification options). The user can use a next control 2542 to select other options for other target classifications.

In one or more embodiments, the model cannot appropriately classify an observation. For instance, the mechanic's notes may not line up with predetermined classifications or the problem is something completely different than the classifications anticipated. In this case, the user can override the model (e.g., by selecting a selection 2546 corresponding to a blank category description), and the computing system can capture that override and record everywhere where a person has disagreed with the model. Using this model at a later time point (e.g., 6 months later), the model may be updated (e.g., by including more options for a target variable or different target variables), and a new sampling scheme can be generated according to embodiments herein to generate a new updated model.

In the same or different embodiments, a target variable may have several layers of options. For instance, FIG. 25C shows an example graphical user interface 2550. The first target variable corresponds to the category of level 2 and has further options given the users classification shown in column 2552. The user can scroll through these different options to find an appropriate description shown in column 2554. A probability for each of the different options is shown in column 2556 based on the predicted classifications given a model generated using embodiments described herein. The probabilities can aid the user in selecting the appropriate classification. A search text box 2564 can also be provided to help a user find the appropriate selection. Here the user selects option landing gear-general gear pins/downlocks with the selection 2560. The user can use a next control 2562 to select other options for other target classifications.

In one or more embodiments, the graphical user interface 2550 may be able to use the classifications to help the mechanic (e.g., by selecting a User Indication 2570). For instance, the user indication 2570 could be used to indicate that an error has occurred to another system that now has the classification of the error. This could be used to request corrective action in view of the classification. Further, the airline may have a large number of reports requesting correction of the gear pins, and the airline company can use the model to determine why the computing system is coming to that conclusion.

One or more embodiments described herein provide a modeling approach that can build a very competitive model compared to traditional models. One or more embodiments described herein also provide full insight into how the model is built and the decisions that a computing device made in classifying. This is helpful for looking at an individual observation and understanding very easily why that document got assigned in a certain way (e.g., a mechanic note) for applications built on the predictions of the aggregated model.

What is claimed is:

1. A computer-program product tangibly embodied in a non-transitory machine-readable storage medium, the computer-program product including instructions operable to cause a computing device to:

receive training data representing different observations of text information in a human language, wherein each observation of the different observations is categorized into one of options for a target variable, wherein the options comprise at least two options within a category for the target variable;

obtain one or more computer commands, each respective computer command of the one or more computer commands specifying a rule for categorizing, based on identifying one or more terms of input data, the input data into one of the options for the target variable;

generate a sampling scheme for sampling terms of the training data according to the one or more computer commands by:

obtaining a variable N indicating a number of iterations for executing the sampling scheme;

obtaining one or more training data indexes, each index of the one or more training data indexes indicating a percentage of the training data;

obtaining one or more term indexes, each index of the one or more term indexes indicating a percentage of terms;

generate multiple randomized sampling models by, for N iterations of the sampling scheme:

determining a respective subset of the training data based on a respective training data index of the one or more training data indexes;

sampling, based on a respective term index of the one or more term indexes, the respective subset of the training data for a subset of terms identified in the respective subset of the training data according to the one or more computer commands; and generating, based on the subset of terms, a respective sampling model, of a set of sampling models, for categorizing, according to the one or more computer commands, wherein each respective sampling model of the set is generated from a different subset of terms than other sampling models of the set such that the sampling models of the set are randomized;

compute an aggregated model for categorizing, according to all the multiple randomized sampling models, test data into one of the options for the target variable;

receive the test data, wherein at least a portion of the test data represents an observation; and output, to a display device, an indication of the aggregated model by outputting a classification of the observation into a given option for the options for a target variable according to the aggregated model.

2. The computer-program product of claim 1, wherein the instructions are operable to cause a computing device to:

compute the aggregated model by generating an output score for each term in the aggregated model that is a term in the multiple randomized sampling models, wherein the output score indicates an importance of a respective term in the aggregated model; and output the indication of the aggregated model by outputting the output score for each term in the aggregated model.

3. The computer-program product of claim 2, wherein the instructions are operable to cause a computing device to, for each respective sampling model of the multiple randomized sampling models, compute a respective sampling score for each term of the respective model, wherein the terms of the respective sampling model are identified according to the one or more computer commands, wherein the respective sampling score indicates an importance of a respective term in the respective sampling model; and wherein the output score for each term in the aggregated model is based on the respective sampling score for each respective sampling model of the multiple randomized sampling models.

4. The computer-program product of claim 2, wherein the instructions are operable to cause a computing device to, for each observation of the different observations, compute a respective sampling score for each term of a respective observation, wherein the respective sampling score indicates an importance of a respective term in categorizing the respective observation into a given one of the one or more options for the target variable; and wherein the output score for each term in the aggregated model is based on the respective sampling score for each observation of the different observations.

5. The computer-program product of claim 2, wherein the instructions are operable to cause a computing device to:

receive precision input for a given term of the one or more computer commands, the precision input indicating a precision score for a given rule specified by a computer command of the one or more computer commands, the rule comprising the given term, wherein the precision score indicates how precise the given rule was at categorizing the input data into the options for the target variable;

receive recall input indicating a recall score for the given rule, wherein the recall score indicates how probable it is that the given rule categorizes the input data according to the given rule; and compute a given sampling score associated with the given term of the multiple randomized sampling models based on the precision input and the recall input.

6. The computer-program product of claim 1, wherein the instructions are operable to cause a computing device to receive the training data by:

extracting, from the different observations, words in the text information, the words comprising a first word; and generating generated data indicating a relationship of the first word to other words in the text information, wherein the generated data indicates a part-of-speech of the first word, a dependency of the first word on the other words, or a frequency of the first word in the input data; and wherein at least one of the one or more computer commands specifies a rule for categorizing based on a given extracted word's relationship to one or more words in the text information.

7. The computer-program product of claim 1, wherein the instructions are operable to cause a computing device to:

receive the training data from a training data set for a machine learning algorithm;

obtain the one or more computer commands by generating them using the machine learning algorithm;

output the indication of the aggregated model by displaying on the display device a score for one or more terms identified based on the one or more computer commands; and in response to the indication of the aggregated model, receive an indication, from a user of the display device, indicating to remove a given computer command of the one or more computer commands for categorizing subsequent input data.

8. The computer-program product of claim 1, wherein the instructions are operable to cause a computing device to:

receive training data by receiving at least two groups of training data, a model-generating training group and a performance-testing training group; and wherein the obtaining the one or more training data indexes or the one or more term indexes of the sampling scheme comprises:

generating testing models generated from sampling the model-generating training group according to different possible indexes for the one or more training data indexes or the one or more term indexes of the sampling scheme;

testing, a performance of the testing models at categorizing the performance-testing training group; and selecting, based on the testing, a single index from the different possible indexes.

9. The computer-program product of claim 1, wherein the instructions are operable to cause a computing device to:

generate a respective sampling model by computing, for each option of the options for the target variable, a respective likelihood that the observation will be classified into a given option of the options for the target variable according to the respective sampling model; and compute an aggregated model by:

averaging from all the multiple randomized sampling models, each respective likelihood for a given option of the options for the target variable; and assigning, to the aggregated model, based on the averaging, a likelihood for the given option.

10. The computer-program product of claim 1, wherein the instructions are operable to cause a computing device to:

generate a respective sampling model by computing, for each option of the options for the target variable, a respective likelihood that the observation will be classified into a given option of the options for the target variable according to the respective sampling model; and compute an aggregated model by:

selecting a maximum of a set of likelihoods comprising each respective likelihood for all of the multiple randomized sampling models for a given option of the options for the target variable; and assigning, to the aggregated model, based on the selecting, a likelihood for the given option.

11. The computer-program product of claim 1, wherein the instructions are operable to cause a computing device to compute an aggregated model by receiving one or more weights indicating to weight different models of the multiple randomized sampling models differently in computing the aggregated model.

12. The computer-program product of claim 1, wherein the instructions are operable to cause a computing device to obtain one or more computer commands by obtaining at least one computer command that specifies multiple terms a presence of which or absence of which must be identified to categorize the input data into a given option of the options for the target variable.

13. The computer-program product of claim 12, wherein the instructions are operable to cause a computing device to:

compute the aggregated model by generating an output score for each term in the aggregated model that is a term in the multiple randomized sampling models, wherein the output score indicates an importance of a respective term in the aggregated model, the respective term weighted based on its relationship to other terms of its respective rule in the one or more computer commands; and output the indication of the aggregated model by displaying the output score for each term in the aggregated model.

14. The computer-program product of claim 1, wherein the instructions are operable to cause a computing device to:

receive a user indication from a user of the display device that the classification according to the aggregated model is incorrect; and in response to the user indication:

generate new training data from the observation for updating the aggregated model with a new sampling model based on sampling a subset of data comprising the new training data, or generate an indication indicating to review the one or more computer commands.

15. The computer-program product of claim 1, wherein the obtaining the variable N comprises:

displaying a graphical user interface for user selection of the variable N; and receiving, from a user of the graphical user interface, via one or more input devices, user input indicating the variable N.

16. The computer-program product of claim 1, wherein obtaining the one or more training data indexes or the one or more term indexes comprises:

displaying a graphical user interface for user selection of multiple indexes for the one or more training data indexes or the one or more term indexes; and receiving, from a user of the graphical user interface, via one or more input devices, user input indicating the user selection of the multiple indexes; and wherein the multiple randomized sampling models comprise at least one model corresponding to a respective index of the multiple indexes.

17. The computer-program product of claim 1, wherein the computing device is configured to generate a sampling scheme by selecting a predetermined default value for one or more of the variable N, the one or more training data indexes and the one or more term indexes.

18. The computer-program product of claim 1, wherein the one or more computer commands comprise:

a first computer command specifying a rule for categorizing into a first option of the options for the target variable; and a second computer command specifying a rule for categorizing into a second option of the options for the target variable, wherein the first option and the second option are different.

19. The computer-program product of claim 1, wherein the sampling the respective subset of the training data for a subset of terms comprises selecting terms of the subset of terms based on received weights for each of possible terms in the subset of the training data.

20. The computer-program product of claim 1, wherein the determining the respective subset of the training data comprises randomly selecting the training data; and wherein the sampling the respective subset of the training data comprises selecting random terms from the respective subset of the training data.

21. A computer-implemented method comprising:

receiving training data representing different observations of text information in a human language, wherein each observation of the different observations is categorized into one of options for a target variable, wherein the options comprise at least two options within a category for the target variable;

obtaining one or more computer commands, each respective computer command of the one or more computer commands specifying a rule for categorizing, based on identifying one or more terms of input data, the input data into one of the options for the target variable;

generating a sampling scheme for sampling terms of the training data according to the one or more computer commands by:

obtaining a variable N indicating a number of iterations for executing the sampling scheme;

obtaining one or more training data indexes, each index of the one or more training data indexes indicating a percentage of the training data;

obtaining one or more term indexes, each index of the one or more term indexes indicating a percentage of terms;

generating multiple randomized sampling models by, for N iterations of the sampling scheme:

determining a respective subset of the training data based on a respective training data index of the one or more training data indexes;

sampling, based on a respective term index of the one or more term indexes, the respective subset of the training data for a subset of terms identified in the respective subset of the training data according to the one or more computer commands; and generating, based on the subset of terms, a respective sampling model, of a set of sampling models, for categorizing, according to the one or more computer commands, wherein each respective sampling model of the set is generated from a different subset of terms than other sampling models of the set such that the sampling models of the set are randomized;

computing an aggregated model for categorizing, according to all the multiple randomized sampling models, test data into one of the options for the target variable;

receiving the test data, wherein at least a portion of the test data represents an observation; and outputting, to a display device, an indication of the aggregated model by outputting a classification of the observation into a given option for the options for a target variable according to the aggregated model.

22. The computer-implemented method of claim 21, wherein computing the aggregated model comprises:

for each respective sampling model of the multiple randomized sampling models, computing a respective sampling score for each term of the respective model, wherein the terms of the respective sampling model are identified according to the one or more computer commands, wherein the respective sampling score indicates an importance of a respective term in the respective sampling model;

generating an output score for each term in the aggregated model that is a term in the multiple randomized sampling models, wherein the output score indicates an importance of a respective term in the aggregated model and is based on the respective sampling score for each respective sampling model of the multiple randomized sampling models; and wherein the outputting the indication of the aggregated model comprises displaying the output score for each term in the aggregated model.

23. The computer-implemented method of claim 21, wherein computing the aggregated model comprises:

for each observation of the different observations, computing a respective sampling score for each term of a respective observation, wherein the respective sampling score indicates an importance of a respective term in categorizing the respective observation into a given one of the one or more options for the target variable; and generating an output score for each term in the aggregated model that is a term in the multiple randomized sampling models, wherein the output score indicates an importance of a respective term in the aggregated model; and wherein the outputting the indication of the aggregated model comprises displaying the output score for each term in the aggregated model, wherein the output score for each term in the aggregated model is based on the respective sampling score for each observation of the different observations.

24. The computer-implemented method of claim 21, wherein the computer-implemented method further comprises:

receiving precision input for a given term of the one or more computer commands, the precision input indicating a precision score for a given rule specified by a computer command of the one or more computer commands, the rule comprising the given term, wherein the precision score indicates how precise the given rule was at categorizing the input data into the options for the target variable;

receiving recall input indicating a recall score for the given rule, wherein the recall score indicates how probable it is that the given rule categorizes the input data according to the given rule; and computing a given sampling score associated with a given term of the multiple randomized sampling models based on the precision input and the recall input.

25. The computer-implemented method of claim 21, wherein the receiving the training data comprises receiving the training data from a training data set for a machine learning algorithm;

wherein the obtaining the one or more computer commands comprises generating them using the machine learning algorithm;

wherein the outputting the indication of the aggregated model comprises displaying on the display device a score for one or more terms identified based on the one or more computer commands; and the computer-implemented method further comprises, in response to the indication of the aggregated model, receiving an indication, from a user of the display device, indicating to remove a given computer command of the one or more computer commands for categorizing subsequent input data.

26. The computer-implemented method of claim 21, wherein the generating the multiple randomized sampling models comprises generating a respective sampling model by computing, for each option of the options for the target variable, a respective likelihood that the observation will be classified into a given option of the options for the target variable according to the respective sampling model; and wherein the computing the aggregated model comprises:

averaging from all the multiple randomized sampling models, each respective likelihood for a given option of the options for the target variable; and assigning, to the aggregated model, based on the averaging, a likelihood for the given option.

27. The computer-implemented method of claim 21, wherein the generating the multiple randomized sampling models comprises generating a respective sampling model by computing, for each option of the options for the target variable, a respective likelihood that the observation will be classified into a given option of the options for the target variable according to the respective sampling model; and wherein the computing an aggregated model comprises:

selecting a maximum of a set of likelihoods comprising each respective likelihood for all of the multiple randomized sampling models for a given option of the options for the target variable; and assigning, to the aggregated model, based on the selecting, a likelihood for the given option.

28. The computer-implemented method of claim 21, wherein the obtaining the one or more computer commands comprises:

a first computer command specifying a rule for categorizing into a first option of the options for the target variable; and a second computer command specifying a rule for categorizing into a second option of the options for the target variable, wherein the first option and the second option are different; and wherein at least one computer command of the one or more computer commands specifies multiple terms a presence of which or absence of which must be identified to categorize the input data into a given option of the options for the target variable.

29. The computer-implemented method of claim 21, computer-implemented method further comprises:

receiving a user indication from a user of the display device that the classification according to the aggregated model is incorrect; and in response to the user indication:

generating new training data from the observation for updating the aggregated model with a new sampling model based on sampling a subset of data comprising the new training data, or generating an indication indicating to review the one or more computer commands.

30. A computing device comprising processor and memory, the memory containing instructions executable by the processor wherein the computing device is configured to:

receive training data representing different observations of text information in a human language, wherein each observation of the different observations is categorized into one of options for a target variable, wherein the options comprise at least two options within a category for the target variable;

obtain one or more computer commands, each respective computer command of the one or more computer commands specifying a rule for categorizing, based on identifying one or more terms of input data, the input data into one of the options for the target variable;

generate a sampling scheme for sampling terms of the training data according to the one or more computer commands by:

obtaining a variable N indicating a number of iterations for executing the sampling scheme;

obtaining one or more training data indexes, each index of the one or more training data indexes indicating a percentage of the training data;

obtaining one or more term indexes, each index of the one or more term indexes indicating a percentage of terms;

generate multiple randomized sampling models by, for N iterations of the sampling scheme:

determining a respective subset of the training data based on a respective training data index of the one or more training data indexes;

sampling, based on a respective term index of the one or more term indexes, the respective subset of the training data for a subset of terms identified in the respective subset of the training data according to the one or more computer commands; and generating, based on the subset of terms, a respective sampling model for categorizing, according to the one or more computer commands, wherein each respective sampling model of the set is generated from a different subset of terms than other sampling models of the set such that the sampling models of the set are randomized;

compute an aggregated model for categorizing, according to all the randomized sampling models, test data into one of the options for the target variable;

receive the test data, wherein at least a portion of the test data represents an observation; and output, to a display device, an indication of the aggregated model by outputting a classification of the observation into a given option for the options for a target variable according to the aggregated model.

* * * * *